US010248954B2

(12) United States Patent
Jin et al.

(10) Patent No.: US 10,248,954 B2
(45) Date of Patent: Apr. 2, 2019

(54) METHOD AND SYSTEM FOR VERIFYING USER IDENTITY USING CARD FEATURES

(71) Applicant: Alibaba Group Holding Limited, George Town, Grand Cayman (KY)

(72) Inventors: Weian Jin, Hangzhou (CN); Jie Zhang, Hangzhou (CA)

(73) Assignee: ALIBABA GROUP HOLDING LIMITED, George Town (KY)

( * ) Notice: Subject to any disclaimer, the term of this patent is extended or adjusted under 35 U.S.C. 154(b) by 552 days.

(21) Appl. No.: 14/739,711

(22) Filed: Jun. 15, 2015

(65) Prior Publication Data
US 2016/0048837 A1 Feb. 18, 2016

(30) Foreign Application Priority Data

Aug. 14, 2014 (CN) .......................... 2014 1 0398375

(51) Int. Cl.

| G06Q 40/00 | (2012.01) |
|---|---|
| G06Q 20/40 | (2012.01) |
| G06K 9/46 | (2006.01) |
| G06K 9/40 | (2006.01) |
| G06K 9/44 | (2006.01) |
| G06K 9/00 | (2006.01) |
| G06K 9/80 | (2006.01) |
| G06K 9/62 | (2006.01) |
| G06K 9/66 | (2006.01) |
| G06Q 20/32 | (2012.01) |

(52) U.S. Cl.
CPC ....... *G06Q 20/409* (2013.01); *G06K 9/00523* (2013.01); *G06K 9/00536* (2013.01); *G06K 9/40* (2013.01); *G06K 9/44* (2013.01); *G06K 9/4671* (2013.01); *G06K 9/6202* (2013.01); *G06K 9/6255* (2013.01); *G06K 9/66* (2013.01); *G06K 9/80* (2013.01); *G06Q 20/32* (2013.01); *G06Q 20/3276* (2013.01); *G06Q 20/4014* (2013.01); *G06K 2009/4695* (2013.01)

(58) Field of Classification Search
CPC .................................................... G06Q 20/409
USPC ............................................................ 705/76
See application file for complete search history.

(56) References Cited

U.S. PATENT DOCUMENTS

| 4,281,391 | A | 7/1981 | Huang |
|---|---|---|---|
| 6,526,166 | B1 | 2/2003 | Gorman |
| 6,697,947 | B1 | 2/2004 | Matyas, Jr. |

(Continued)

FOREIGN PATENT DOCUMENTS

| CN | 201498035 | 6/2010 |
|---|---|---|
| DE | 102004047258 | 4/2006 |

(Continued)

*Primary Examiner* — Scott S Trotter
(74) *Attorney, Agent, or Firm* — Shun Yao; Park, Vaughan, Fleming & Dowler LLP

(57) ABSTRACT

One embodiment of the present invention provides a system that facilitates identity verification based on various features of a card. During operation, a server receives a request for identity verification, where the request corresponds to an account and includes an image of a verifiable card. The server extracts a card feature from the verifiable card image for use as a verifiable card feature. In response to determining that the verifiable card feature matches a corresponding card feature of a registered card of the account, the server determines successful identity verification.

26 Claims, 13 Drawing Sheets

(56) References Cited

U.S. PATENT DOCUMENTS

| | | | |
|---|---|---|---|
| 6,726,094 B1 * | 4/2004 | Rantze | G06Q 20/20 235/379 |
| 7,149,720 B2 | 12/2006 | Shepherd | |
| 7,321,874 B2 | 1/2008 | Dilip | |
| 7,734,527 B2 | 6/2010 | Uzo | |
| 7,809,636 B1 | 10/2010 | Jou | |
| 7,809,762 B1 | 10/2010 | Parker | |
| 7,941,760 B2 | 5/2011 | Kocienda | |
| 7,946,474 B1 | 5/2011 | Agrawal | |
| 7,978,900 B2 * | 7/2011 | Nepomniachtchi | G06K 9/36 235/379 |
| 8,090,642 B1 | 1/2012 | Van Doren | |
| 8,176,324 B1 | 5/2012 | Krishnamurthy | |
| 8,280,782 B1 | 10/2012 | Talreja | |
| 8,423,392 B2 | 4/2013 | Moxley | |
| 8,423,467 B1 | 4/2013 | Johansson | |
| 8,645,295 B1 | 2/2014 | Dillard | |
| 9,111,073 B1 | 8/2015 | Jiang | |
| 9,239,722 B1 | 1/2016 | Calahan | |
| 9,305,230 B2 * | 4/2016 | Abulafia | G06K 9/2054 |
| 9,621,348 B2 | 4/2017 | Bahjat | |
| 2002/0111916 A1 | 8/2002 | Coronna | |
| 2002/0161466 A1 | 10/2002 | Heching | |
| 2003/0042301 A1 | 3/2003 | Rajasekaran | |
| 2003/0061172 A1 * | 3/2003 | Robinson | G06Q 20/04 705/67 |
| 2003/0200190 A1 | 10/2003 | Adar | |
| 2004/0139008 A1 | 7/2004 | Mascavage | |
| 2004/0153407 A1 | 8/2004 | Clubb | |
| 2005/0038707 A1 | 2/2005 | Roever | |
| 2005/0071637 A1 | 3/2005 | Shirakawa | |
| 2005/0075954 A1 | 4/2005 | Matsumoto | |
| 2005/0113123 A1 | 5/2005 | Torvinen | |
| 2005/0144406 A1 | 6/2005 | Chong, Jr. | |
| 2005/0170856 A1 | 8/2005 | Keyani | |
| 2005/0240935 A1 | 10/2005 | Ramanathan | |
| 2006/0010190 A1 | 1/2006 | Shimbo | |
| 2006/0056626 A1 | 3/2006 | Keohane | |
| 2006/0069635 A1 | 3/2006 | Ram | |
| 2006/0089897 A1 | 4/2006 | Maas | |
| 2006/0176847 A1 | 8/2006 | Chen | |
| 2006/0220842 A1 | 10/2006 | Breed | |
| 2006/0271783 A1 | 11/2006 | Wong | |
| 2007/0035617 A1 | 2/2007 | Ko | |
| 2007/0043651 A1 | 2/2007 | Xiao | |
| 2007/0276730 A1 | 11/2007 | Lee | |
| 2008/0004981 A1 | 1/2008 | Gopalpur | |
| 2008/0077542 A1 | 3/2008 | McElhiney | |
| 2008/0097805 A1 | 4/2008 | Wells | |
| 2008/0119160 A1 | 5/2008 | Andriantsiferana | |
| 2008/0120160 A1 | 5/2008 | Woo | |
| 2008/0182586 A1 | 7/2008 | Aaron | |
| 2008/0228595 A1 | 9/2008 | Hill | |
| 2008/0306839 A1 * | 12/2008 | Starrs | G06Q 20/042 705/27.1 |
| 2009/0076926 A1 | 3/2009 | Zinberg | |
| 2009/0090772 A1 | 4/2009 | Lee | |
| 2009/0106825 A1 | 4/2009 | Cerruti | |
| 2009/0144451 A1 | 6/2009 | Cabezas | |
| 2009/0157522 A1 | 6/2009 | Srinivasan | |
| 2009/0195506 A1 | 8/2009 | Geidl | |
| 2010/0060585 A1 | 3/2010 | Chiu | |
| 2010/0073302 A1 | 3/2010 | Ritzau | |
| 2010/0088026 A1 | 4/2010 | Manolescu | |
| 2010/0162036 A1 | 6/2010 | Linden | |
| 2010/0191648 A1 | 7/2010 | Smith | |
| 2010/0210240 A1 | 8/2010 | Mahaffey | |
| 2010/0223543 A1 | 9/2010 | Marston | |
| 2010/0235283 A1 | 9/2010 | Gerson | |
| 2010/0241575 A1 | 9/2010 | Cotton | |
| 2010/0250436 A1 | 9/2010 | Loevenguth | |
| 2011/0016520 A1 | 1/2011 | Cohen | |
| 2011/0093493 A1 | 4/2011 | Nair | |
| 2011/0125616 A1 | 5/2011 | Ni | |
| 2011/0184840 A1 | 7/2011 | Godard | |
| 2011/0231465 A1 | 9/2011 | Phatak | |
| 2011/0258027 A1 | 10/2011 | Lee | |
| 2011/0264598 A1 | 10/2011 | Fuxman | |
| 2012/0016799 A1 | 1/2012 | Killian | |
| 2012/0076283 A1 | 3/2012 | Ajmera | |
| 2012/0101942 A1 | 4/2012 | Park | |
| 2012/0117271 A1 | 5/2012 | Kennedy | |
| 2012/0143924 A1 | 6/2012 | Sethi | |
| 2012/0158467 A1 | 6/2012 | Hammad | |
| 2012/0204256 A1 | 8/2012 | Craine | |
| 2012/0259774 A1 | 10/2012 | Marti | |
| 2012/0259783 A1 | 10/2012 | Kemper | |
| 2012/0299831 A1 | 11/2012 | Lioy | |
| 2012/0323846 A1 | 12/2012 | Bai | |
| 2013/0066889 A1 | 3/2013 | Rodriguez | |
| 2013/0094751 A1 | 4/2013 | Nepomniachtchi | |
| 2013/0110670 A1 | 5/2013 | Webber | |
| 2013/0208977 A1 | 8/2013 | Jia | |
| 2013/0232071 A1 | 9/2013 | Dilip | |
| 2013/0246172 A1 | 9/2013 | Moissinac | |
| 2013/0311532 A1 | 11/2013 | Olsen | |
| 2013/0317895 A1 | 11/2013 | Turner | |
| 2013/0331130 A1 | 12/2013 | Lee | |
| 2014/0037184 A1 | 2/2014 | Gorski | |
| 2014/0052636 A1 | 2/2014 | Mattes | |
| 2014/0156512 A1 | 6/2014 | Rahman | |
| 2014/0162698 A1 | 6/2014 | Han | |
| 2014/0164109 A1 | 6/2014 | Chow | |
| 2014/0236801 A1 | 8/2014 | Hansen | |
| 2014/0279525 A1 | 9/2014 | Mohsenzadeh | |
| 2014/0280910 A1 | 9/2014 | Swig | |
| 2014/0306896 A1 | 10/2014 | Sosby | |
| 2014/0310171 A1 | 10/2014 | Grossman | |
| 2015/0066679 A1 | 3/2015 | Mack | |
| 2015/0186989 A1 | 7/2015 | Kneen | |
| 2015/0220876 A1 | 8/2015 | Sethi | |
| 2015/0235477 A1 | 8/2015 | Simkin | |
| 2015/0356288 A1 | 12/2015 | Guo | |
| 2015/0379460 A1 | 12/2015 | Zamer | |
| 2016/0012503 A1 | 1/2016 | Fu | |
| 2016/0077734 A1 | 3/2016 | Buxton | |
| 2017/0270598 A1 | 9/2017 | Ram | |

FOREIGN PATENT DOCUMENTS

| | | |
|---|---|---|
| EP | 0992949 | 4/2000 |
| EP | 1067471 | 1/2001 |
| WO | 2012045128 | 4/2012 |
| WO | 2012045128 A1 | 4/2012 |
| WO | 2013003372 | 1/2013 |
| WO | 2013149883 | 10/2013 |
| WO | 2017080768 | 5/2017 |

* cited by examiner

METHOD AND SYSTEM FOR VERIFYING USER IDENTITY USING CARD FEATURES

RELATED APPLICATION

Under 35 U.S.C. 119, this application claims the benefit and right of priority of Chinese Patent Application No. 201410398375.8, filed 14 Aug. 2014.

BACKGROUND

Field

The present application relates to the field of identity verification and, particularly, to a method and system for verifying user identity based on features of a card.

Related Art

Social progress and the rapid development of technology continue to fuel the use of applications that require financial and personal information of a user. As a result, there is an increased need for secure, accurate, and efficient verification of user identity in many types of applications. For example, a user who wishes to purchase an item using an online application can use a card to complete the transaction (e.g., purchasing a clothing item from an online retailer using a bank card or credit card of the user). The user can enter private information for his card (e.g., the card number and the user's password) in the application window, and a server responsible for identity verification can validate the entered card information by determining whether the entered information matches previously registered information for a corresponding account. While operating a system that requires only a "card number+password" combination can be convenient and simple, potential security issues may arise. For example, unauthorized access to the user's private card information can occur at the server or during the process of transmission through the network. Subsequently, an unauthorized entity (who is not the true holder of the card) need only enter the obtained card information (e.g., the "card number+password" combination) to use the card for potentially illicit purposes. This can result in both inconvenience and monetary loss to the user.

SUMMARY

One embodiment of the present invention provides a system that facilitates identity verification based on various features of a card. During operation, a server receives a request for identity verification, where the request corresponds to an account and includes an image of a verifiable card. The server extracts a card feature from the verifiable card image for use as a verifiable card feature. In response to determining that the verifiable card feature matches a corresponding card feature of a registered card of the account, the server determines successful identity verification.

In a variation on this embodiment, the server receives an image of a registered card which corresponds to the account. The server extracts a card feature from the registered card image for use as a registered card feature and stores the registered card feature.

In a further variation, the server encrypts the registered card feature based on an encryption algorithm, and stores the encrypted registered card feature. The server also decrypts the encrypted registered card feature based on a decryption algorithm which corresponds to the encryption algorithm. The server then determines that the verifiable card feature matches the decrypted registered card feature.

In a further variation, a card feature extracted from a corresponding card image of the verifiable card or the registered card is one or more of a number feature, a pattern feature, a material feature, and a graphic feature. The graphic feature is one or more of a character feature, a logo feature, and a signature feature. The server then determines that each of the one or more verifiable card features matches a corresponding one or more registered card features.

In a further variation, the extracted card feature is a number feature. The server extracts number information from the corresponding card image, where the number information is the number feature of the corresponding card. The server converts the card image into a grayscale image and determines a rectangular image area from the grayscale image that includes the number information. The server identifies the number information in the rectangular image area. In response to determining that the number information from the verifiable card feature matches the number information from the registered card feature, the server determines that the number feature of the verifiable card matches the number feature of the registered card.

In a further variation, in determining the rectangular image area, the server performs one or more of the following steps: identifies a template which corresponds to the card image, and determines the rectangular image area based on area and position information from the template; and segments the card image horizontally based on an edge detection algorithm, and determines the rectangular image area based on the segmented card image.

In a further variation, in identifying the number information in the rectangular image area, the server segments the rectangular image area vertically based on an edge detection algorithm. The server determines a plurality of images of numbers based on the segmented rectangular image area, where each of the number images is an identifiable number image that includes an identifiable number. The server identifies one or more feature values for each identifiable number image. For each of one or more sample number images stored by the server, the server calculates a logical distance between the feature value for a respective identifiable number image and a corresponding feature value for the sample number image based on a classification algorithm. In response to selecting one of the sample number images based on a shortest calculated logical distance, where the selected sample number image includes a number, the server determines that the identifiable number included in the identifiable number image is the number included in the selected sample number image.

In a further variation, the extracted card feature is a pattern feature. The server extracts the pattern feature from the corresponding card image. The server normalizes a size of the card image based on a predetermined size. The server extracts a predetermined number of image blocks from the normalized card image based on a predetermined position and a predetermined size. The server assigns a pixel value for each of the predetermined number of image blocks based on a sample set normalization for a respective image block. The server determines a local feature for the respective image block based on a dictionary learning method and identifies an image feature of the card image based on the local feature and a pooling technology. In addition, the server calculates a logical distance between the pattern feature of the verifiable card and the pattern feature of the registered card, where the logical distance indicates a similarity of pattern images which correspond to the verifiable card pattern feature and the registered card pattern feature. In response to determining that the calculated logical distance is greater than a predetermined threshold, the server determines that the pattern feature of the verifiable card matches the pattern feature of the registered card.

In a further variation, the server converts the card image into a grayscale image. The server can also perform a whitening process on the respective image block, where the whitening process removes a correlation between neighboring pixel values.

In a further variation, the extracted card feature is a pattern feature. The server extracts the pattern feature from the corresponding card image. The server extracts one or more feature points of the card image based on an image detection algorithm and generates one or more corresponding feature vectors of the card image based on the image detection algorithm. For each of the feature points of the pattern feature of the verifiable card, the server calculates a logical distance between the corresponding vector of the verifiable card and a vector of the registered card that corresponds to the respective feature point of the pattern feature of the registered card, and, in response to determining that a feature point of the verifiable card matches a feature point of the registered card based on the calculated logical distance, the server increases a count of successfully matched feature points. In response to determining that the count of successfully matched feature points is greater than a predetermined threshold, the server determines that the pattern feature of the verifiable card matches the pattern feature of the registered card.

In a further variation, the extracted card feature is a material feature. The server extracts data related to the card material from the corresponding card image, where the data is the material feature of the corresponding card. The server identifies an image area from the card image based on a predetermined position and a predetermined size, where the image area includes a plurality of pixel points, and extracts component values of hue, saturation, and luminance from each of the pixel points included in the image area. The server also generates a discrete sample curved surface based on the component values extracted from the pixel points corresponding to the registered card, where one component value is predetermined to be a vertical coordinate and the remaining component values are predetermined to be horizontal coordinates. The server smoothes the discrete sample curved surface to obtain a continuous curved surface. For each of the pixel points included in the image area corresponding to a verifiable card, the server calculates a minimum distance between the component value of a respective pixel point and the continuous curved surface, and, in response to determining that the calculated minimum distance is greater than a predetermined threshold, the system determines that the respective pixel point matches the material feature of the registered card and increases a count of successfully matched pixel points. In response to determining that the count of successfully matched pixel points is greater than a predetermined threshold, the system determines that the material feature of the verifiable card matches the material feature of the registered card.

In a further variation, the component value of saturation is the predetermined vertical coordinate.

In a further variation, the extracted card feature is a graphic feature. The server extracts the graphic feature from the corresponding card image. The server identifies a template which corresponds to the card image and determines an image in the image area corresponding to the graphic feature in the card image based on area and position information from the template. The server adjusts a size of the determined image corresponding to the graphic feature of the verifiable card, where the adjusted size is equal to a size of the corresponding image of the registered card. For each of one or more pixel points in the adjusted size image of the verifiable card, in response to determining that a pixel value for a respective pixel point is equal to a pixel value for a corresponding pixel point in the corresponding image of the registered card, the server increases a count of successfully matched pixel points. In response to determining that the count of successfully matched pixel points is greater than a predetermined threshold, the server determines that the graphic feature of the verifiable card matches the graphic feature of the registered card.

Another embodiment of the present invention provides a system that verifies identity based on various features of a card. During operation, a client computing device obtains an image of a verifiable card, where the verifiable card image is used for identity verification. The client computing device sends a request to a server for identity verification, where the request includes the verifiable card image and corresponds to an account. In response to the request, the client computing device receives a response from the server, where the response indicates successful or unsuccessful identity verification.

In a further variation on this embodiment, the client computing device obtains an image of a registered card, where the registered card image is used for identity verification and corresponds to the account. The client computing device sends the registered card image to the server.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the present invention solve the problem of improving the security of online transactions involving a card by comparing features of a card for verification ("verifiable card") with similar features of a card that has been previously registered and authenticated for the account ("registered card"). During a registration process, the system obtains an image of a registered card (e.g., the authentic, physical card for the account) from a user, extracts various card features from the card image, and stores the card features for later comparison with similar card features of a verifiable card (e.g., a card to be verified and compared against the registered card). Subsequently, when the user wishes to use his card, the user sends an image of the card (e.g., the verifiable card) to the server. The system uses various image processing techniques to extract card features from the image of the registered card and the image of the verifiable card. The card features can include a number feature, a pattern feature, a material feature, and a graphic feature. If the card features of the verifiable card match the corresponding card features of the registered card, the result is successful identity verification. If not, the result is unsuccessful identity verification. In this manner, only a user who has the physical card (or an image of the physical card) that corresponds to the previously registered card can pass the identity verification methods described herein, thus increasing the security of identity verification for online transactions.

Figure 1A:
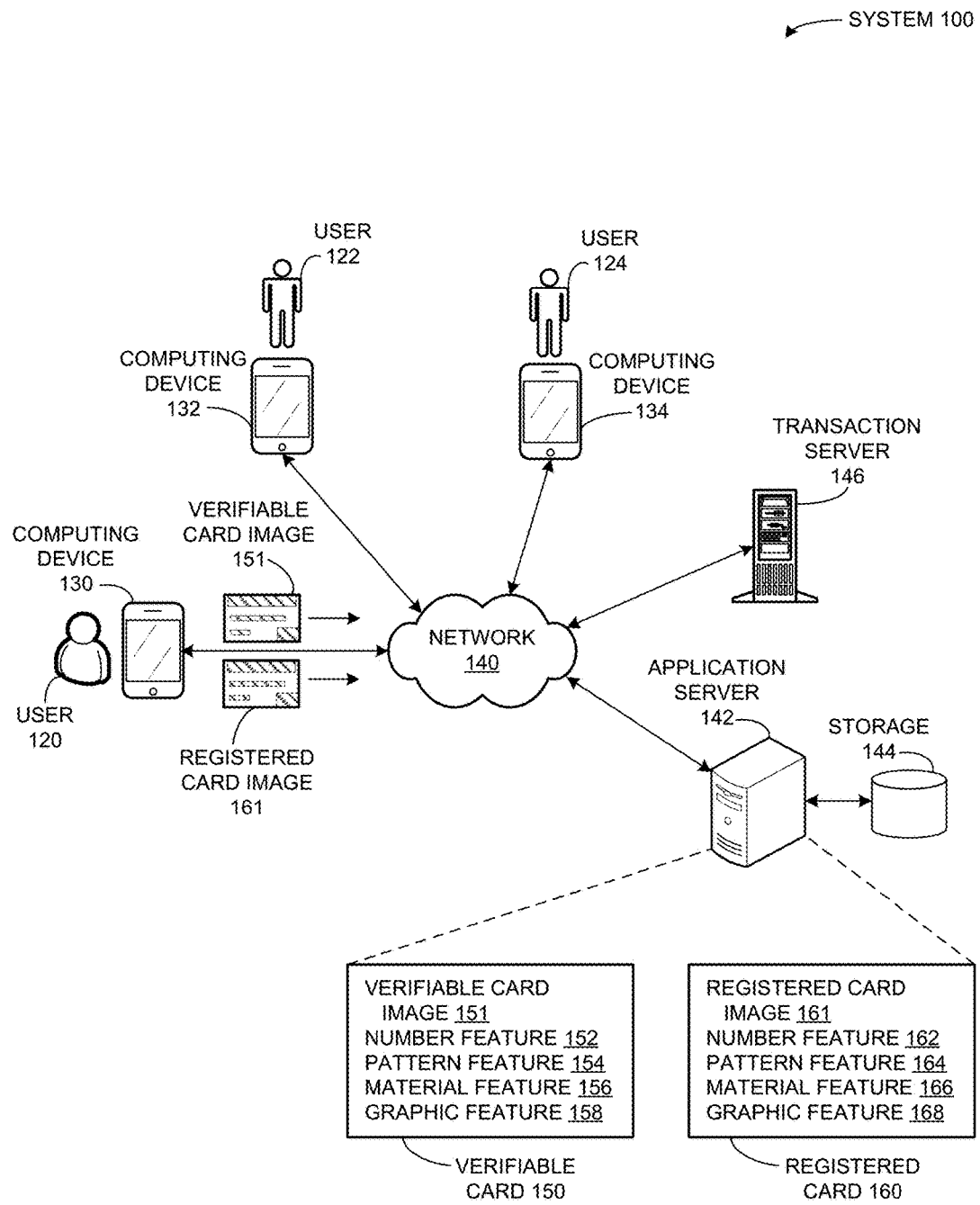
FIG. 1A illustrates an exemplary computing system that facilitates secure identity verification, in accordance with an embodiment of the present application.

FIG. 1A illustrates an exemplary computing system 100 that facilitates secure identity verification, in accordance with an embodiment of the present application. In this example, system 100 can include computing devices 130, 132, and 134, which are associated with users 120, 122, and 124, respectively. Computing devices 130-134 can include, for example, a desktop computer, a tablet, a mobile phone, a laptop, a home media center, or any other computing device. Computing devices 130-134 can communicate with an application server 142 and a transaction server 144 (e.g., an electronic commerce merchant's datacenter) via a network 140. Application server 142 can communicate with a storage device 144.

During operation, user 120 can register his card with application server 142 by sending an image of the card (e.g., registered card image 161) to application server 142. Registered card image 161 can be sent to server 142 during the registration process, e.g., upon initialization of the card for the account of user 120. Upon receiving the registered card image, the application server extracts various card features from the registered card image and stores the extracted card features as corresponding to a registered card for the account of the user. For example, application server 142 can extract and store from registered card image 161 a number feature 162, a pattern feature 164, a material feature 166, and a graphic feature 168. Application server 142 can store a registered card 160 (which includes registered card image 161 and the extracted registered card features 162-168) directly or in storage 144. In some embodiments, user 120 can enter the card number and select a password for the card, and application server 142 can store the entered card number and password as corresponding to the account of user 120.

Subsequently, user 120 may wish to use his card (which has been previously registered with application server 142) to conduct an online transaction. User 120 sends an image of his card for verification to the server for verification. For example, user 120 can send a verifiable card image 151 to application server 142. Upon receiving verifiable card image 151, application server 142 extracts various card features from card image 151, such as a number feature 152, a pattern feature 154, a material feature 156, and a graphic feature 158. Application server 142 can store a verifiable card 150 (which includes verifiable card image 151 and the extracted verifiable card features 152-158) directly or in storage 144.

For each card feature of verifiable card 150, application server 142 determines whether the verifiable card feature (e.g., number feature 152) matches a corresponding card feature (e.g., number feature 162) of registered card 160. If all of the corresponding features match, application server 142 returns a successful identity verification result to user 120, which allows user 120 to proceed with his online transaction. In some embodiments, application server 142 can send a request to make an online payment to transaction server 146, which can result in requiring the user to enter the card number and password in order to continue the verification process. If all of the corresponding features do not match, application server 142 returns an unsuccessful identity verification result to user 120, which prohibits user 120 from proceeding with the online transaction related to verifiable card image 151. Thus, even if users 122 and 124 (via computing device 132 and 134, respectively) are in possession of the card number and password of registered card 160, users 122 and 124 are unable to use the card number and password without also obtaining an image of the registered card (e.g., registered card image 161). In this manner, the system uses the features of a card to provide secure identity verification.

The term "card" is used in a generic sense, and can refer to a credit card, a bank card, a store card for a specific retailer, or any card that can be used by a user to conduct a banking transaction, a financial transaction, a user transaction, an online transaction, and the like. Furthermore, the identity verification method and system described herein is not limited to online transactions. The system can also be used to verify the identity of a card holder.

Application Server

Figure 1B:
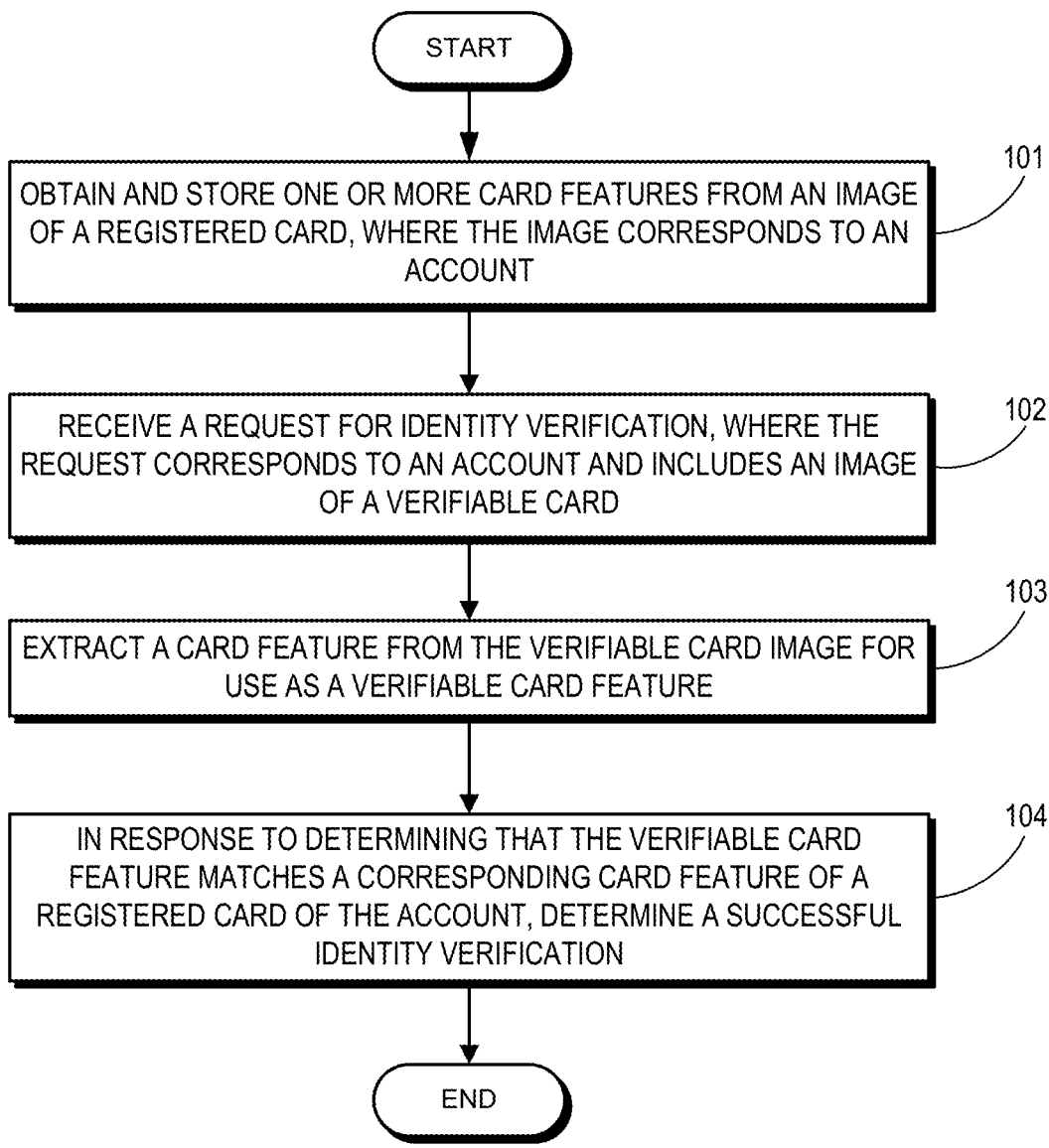
FIG. 1B presents a flowchart illustrating an operation performed by an application server for facilitating secure identity verification, in accordance with an embodiment of the present application.

FIG. 1B presents a flowchart illustrating an operation performed by an application server for facilitating secure identity verification, in accordance with an embodiment of the present application. The server obtains and stores an image of a registered card, either during operation or during a registration process that can occur before operation of the system begins. The server obtains and stores one or more card features from the image of the registered card, where the image corresponds to an account (operation 101). This "registration process" is described below in relation to FIG. 2.

Subsequently, the server receives a request for identity verification, where the request corresponds to an account and includes an image of a verifiable card (operation 102). The request can be sent by a client computing device of a user when the user wishes to perform an operation using the card (e.g., performing an online payment based on the bank card number). The user can send the image of the verifiable card as a photograph via an email, text message, web application, and the like. Both the front surface and the back surface of the card can contain relevant information. For example, the card number can be on the front of a bank card, and the signature area image can be on the back of the bank card. Thus, the verifiable card image sent by the user can include both the front and back surface images of the card.

Upon receiving the request for identity verification, the server extracts a card feature from the verifiable card image for use as a verifiable card feature (operation 103). The card feature extracted from the verifiable card image can be one or more of a number feature, a pattern feature, a material feature, and a graphic feature. Extracting a card feature is described below in relation to FIG. 3.

In response to determining that the verifiable card feature matches a corresponding card feature of the registered card of the account, the server determines successful identity verification (operation 104). As described above, the server can extract one or more verifiable card features (from operation 103). Thus, for each verifiable card feature, the server determines whether the verifiable card features matches the corresponding registered card feature. If the server determines a successful match for each verifiable card feature, the server returns successful identify verification. If not, e.g., if any one of the verifiable card features does not match the corresponding registered card feature, the server returns unsuccessful identity verification. Determining whether the card features of the verifiable card and the registered card match is described below in relation to FIG. 8.

Registration Process

Figure 2:
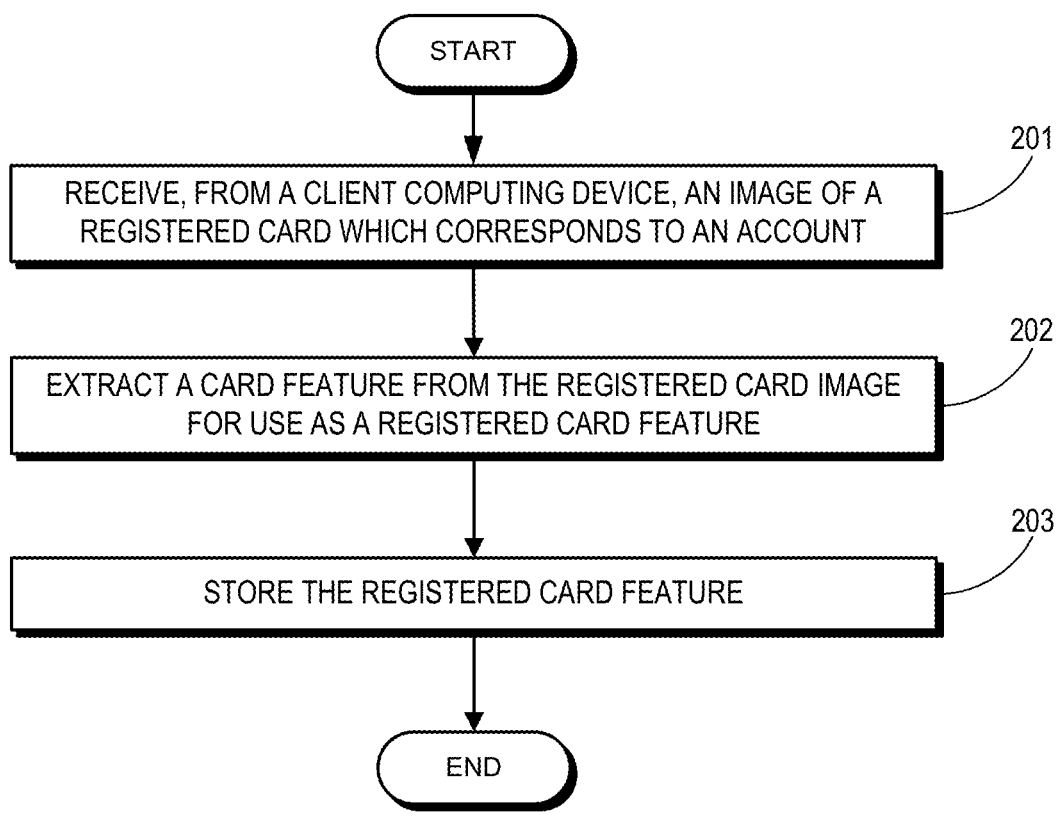
FIG. 2 presents a flowchart illustrating an operation performed by an application server for obtaining and storing a card feature of a registered card, in accordance with an embodiment of the present application.

FIG. 2 presents a flowchart illustrating an operation performed by an application server for obtaining and storing a card feature of a registered card, in accordance with an embodiment of the present application. This operation can occur during the registration process of the application. During operation, the server receives, from a client computing device, an image of a registered card, where the image corresponds to an account (operation 201). The registered card image is used as a benchmark for performing subsequent identity verification. The server can receive the registered card image as a photograph via an email, text message, web application, and the like.

Figure 3:
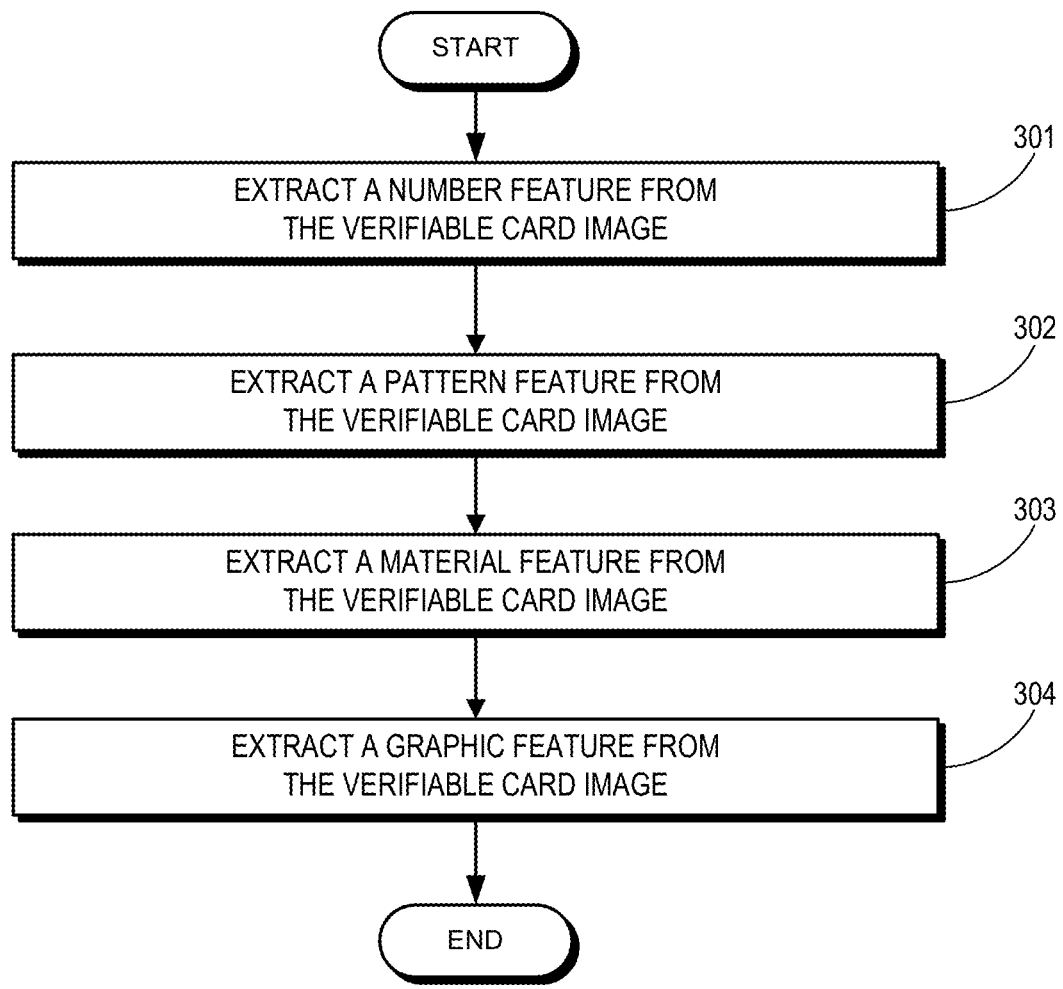
FIG. 3 presents a flowchart illustrating an operation performed by an application server for extracting a card feature from a verifiable card, in accordance with an embodiment of the present application.

The server then extracts a card feature from the registered card image for use as a registered card feature (operation 202). Similar to the card feature extracted from the verifiable card image (in operation 103 of FIG. 1), the card feature extracted from the registered card image can include one or more of a number feature, a pattern feature, a material feature, and a graphic feature. Extracting a card feature is described below in relation to FIG. 3. Note that while FIG. 3 depicts an operation for extracting a card feature from a verifiable card, the operation for extracting a card feature from a registered card is similar.

After extracting the registered card feature, the server stores the extracted card feature from the registered card image (operation 203). The extracted registered card feature and corresponding account information can be stored in a database, so that when the servers receives a subsequent identity verification request, the server can use the stored registered card feature for comparison with the corresponding card feature of the verifiable card.

Some of the card features extracted from the card image are physical features of the card itself (e.g., the pattern feature, the material feature, and the graphic feature). Other card features extracted from the card image can include private information of the user (e.g., the number feature which includes the card number of the user account). To protect the private information of the user, some embodiments of the present invention provide an encrypted storage mode to store the extracted registered card features. During operation, upon extracting a card feature from the registered card, the server encrypts the registered card feature based on an encryption algorithm and stores the encrypted registered card feature. For example, the system can use a symmetric encryption algorithm such as RC4 to encrypt the number feature of the registered card, and store this encrypted number feature. Upon receiving a request for identity verification from a client computing device, the server determines that the verifiable card feature matches a corresponding registered card feature by first decrypting the encrypted registered card feature based on the encryption algorithm, and then determining whether the verifiable card features matches the decrypted registered card feature. The symmetric encryption algorithm RC4 mentioned above is only an example. The server can use any encryption algorithm, or, in some instances, can use no encryption algorithm based on a configured setting.

Extracting a Card Feature

FIG. 3 presents a flowchart illustrating an operation performed by an application server for extracting a card feature from a verifiable card, in accordance with an embodiment of the present application. Note that while FIG. 3 depicts an operation for extracting a card feature from a verifiable card, the operation for extracting a card feature from a registered card (e.g., operation 202 of FIG. 2) is similar. During operation, the server extracts a number feature from the verifiable card image (operation 301). The number feature refers to number information contained in the card image and generally refers to card number information, e.g., a bank card number. The number feature is extracted from the registered card image in operation 202 of FIG. 2 in a similar manner as the number feature is extracted from the verifiable card image, as described below in relation to FIG. 4.

Figure 5:
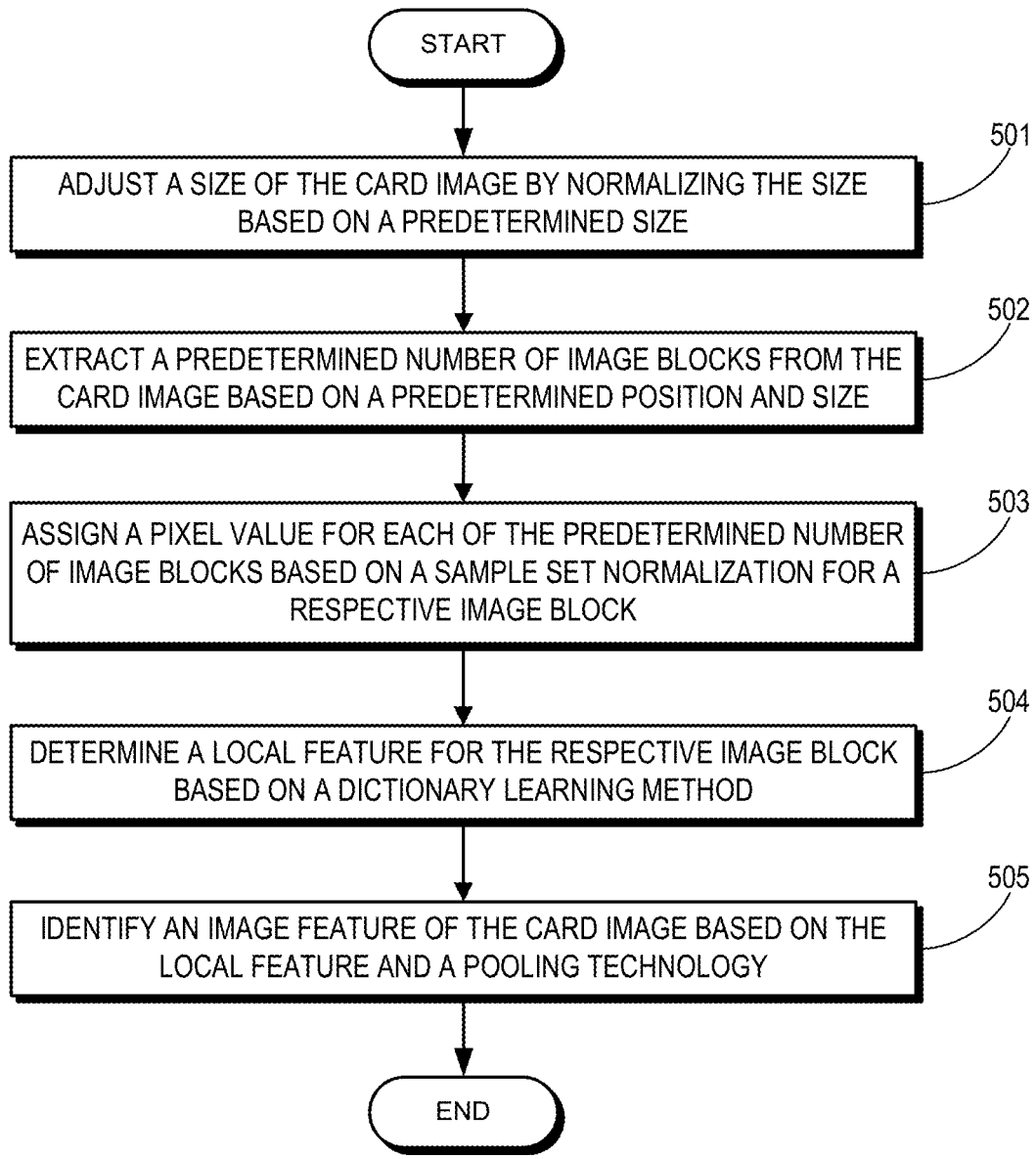
FIG. 5 presents a flowchart illustrating an operation performed by an application server for extracting a pattern feature from a card image, in accordance with an embodiment of the present application.

The server can also extract a pattern feature from the verifiable card image (operation 302). The pattern feature refers to an image feature of the card image. The pattern feature is extracted from the registered card image in operation 202 of FIG. 2 in a similar manner as the pattern feature is extracted from the verifiable card image, as described below in relation to FIG. 5. In addition, FIG. 5 depicts the process of extracting the pattern feature from the corresponding card image based on a dictionary learning method. The server can also extract the pattern feature of the card based on the Scale-Invariant Feature Transform (SIFT) algorithm, as described below in relation to operation 504 of FIG. 5 (e.g., extracting the feature points or key points and corresponding feature vectors).

The server also extracts a material feature from the verifiable card image (operation 303). The material feature in the present application refers to data related to the card material. The server determines whether the material features of the registered card and the verifiable card match by analyzing and comparing the data related to the card material for the corresponding card. The material feature is extracted from the registered card image in operation 202 of FIG. 2 in a similar manner as the material feature is extracted from the verifiable card image, as described below in relation to FIG. 6.

Furthermore, the server extracts a graphic feature from the verifiable card image (operation 304). The material graphic in the present application refers to an image located in a specific area on the card, and can include one or more of: a character feature, a logo feature and a signature feature. The character feature can refer to an image of the area where the card name is located (e.g., an image of the area where the bank card name is located on a bank card). The logo feature can refer to a logo image. The signature feature can refer to an image of a signature area (e.g., an image of the signature area on the back surface of the bank card). In some embodiments, the server can extract one or more of the above-mentioned graphic features from the card image based on a configured setting. The graphic feature is extracted from the registered card image in operation 202 FIG. 2 in a similar manner as the graphic feature is extracted from the verifiable card image, as described below in relation to FIG. 7.

Extracting these four card features (the number feature, the pattern feature, the material feature, and the graphic feature) is described in detail in relation to FIGS. 4-7, respectively. Note that the card features can be extracted in any order, including an order different from the one described above in relation to FIG. 3. In some embodiments, the server extracts only one or more of the card features. Furthermore, the server can use other processes, operations, and algorithms to extract the card features. The server can also extract other data capable of characterizing the card features.

Extracting a Number Feature

Figure 4:
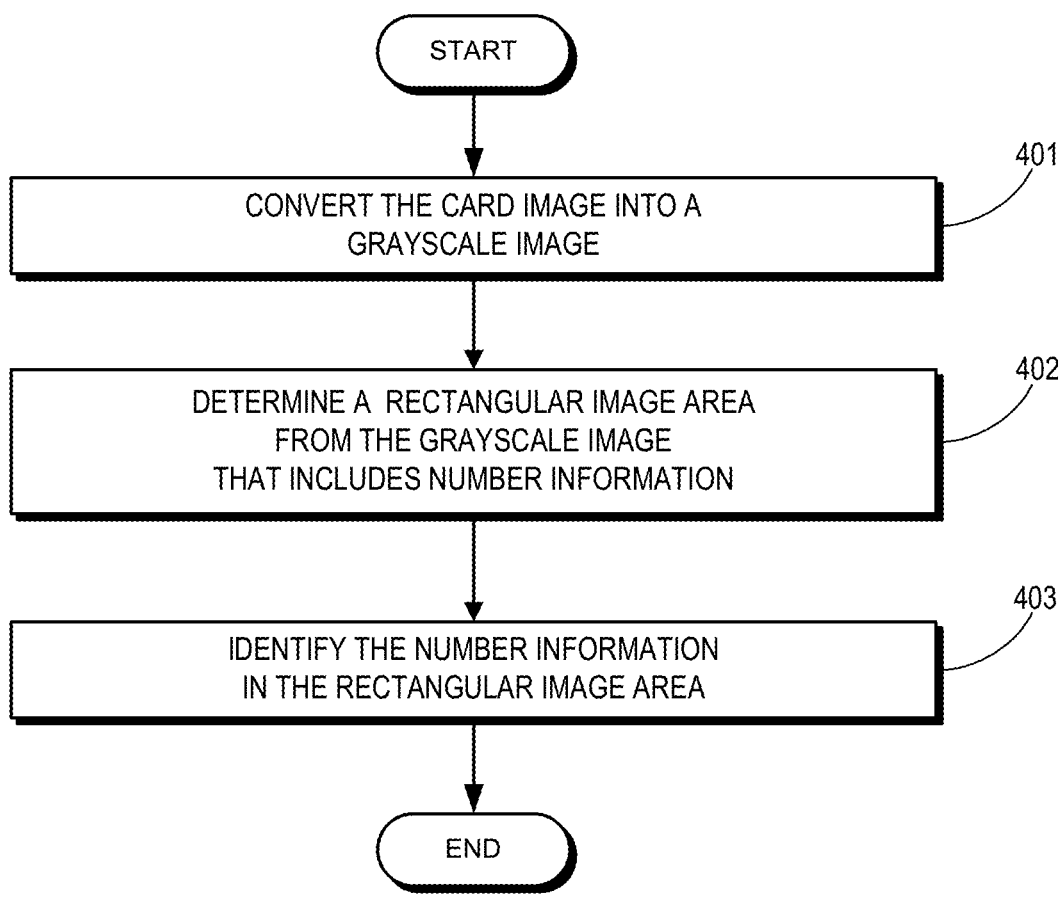
FIG. 4 presents a flowchart illustrating an operation performed by an application server for extracting a number feature from a card image, in accordance with an embodiment of the present application.

FIG. 4 presents a flowchart illustrating an operation performed by an application server for extracting a number feature from a card image, in accordance with an embodiment of the present application. During operation, the server converts the card image into a grayscale image (operation 401). In some embodiments, before converting the card image into a grayscale image, the server performs a denoising process to reduce the influence of noise in the image during the processing of the image. The common noise in an image can include two types of noise: "Gaussian noise" and "salt-and-pepper noise." The Gaussian noise refers to a type of noise with a probability density function that complies with a Gaussian distribution (e.g., a normal distribution). The salt-and-pepper noise refers to black and white, bright and dark spot noise generated by an image sensor, a transmission channel, decoding processing, and the like. These two types of noise can be reduced or eliminated by methods such as low-pass filtering, median filtering, and the like.

After the denoising process, the server can convert the card image into the grayscale image (e.g., "graying processing" or a "graying method") (operation 401). The server initially obtains a template (e.g., a card template) based on the average gray value of the card image as determined in subsequent steps, which reduces the subsequent calculated amount of the average gray value. The color of each pixel in a color image is determined by three components: red (R); green (G); and blue (B) (together, "RGB"). The range for the value of each component is 0-255, for a total of 256 possible values for each component. Thus, each pixel point can have 16 million (e.g., 256*256*256) different values. The grayscale image is a particular image in which the three components R, G, and B are the same. To reduce the complexity of subsequent digital image processing, the color image can first be converted into a grayscale image. A variety of graying methods can be used. In one method, for each pixel point, the server can determine the average value of the three components R, G, and B, and then assign the average value to the respective pixel point. In another method, the server can use a YUV color space, which encodes a color image by taking human perception into account and allows a reduced bandwidth for chrominance components. Specifically, the server can establish a corresponding relationship of luminance (Y) and the three color components R, G, and B based on the relationship of the RGB and YUV color spaces and the following equation:

$$Y=0.3R+0.59G+0.11B \quad \text{(Equation 1)}$$

The server can use the calculated luminance value Y of the respective pixel point as the corresponding gray value.

Upon converting the card to a grayscale image, the server determines a rectangular image area from the grayscale image that includes number information (operation 402). The server can determine the rectangular image area based on two methods: (1) a previously-stored card template; and (2) an edge detection algorithm. Note that a particular card image can include images in different areas based on specific rules for the card. To determine the rectangular area based on the first method, the server can collect, generate, and store generate template information based on various representative cards. For example, the template information for a UnionPay bank card can include the average gray value of the card image, the location of the UnionPay logo in the card image, the size of the UnionPay logo image, a specific UnionPay logo image, and the location of each image area in the card. In this first method, the server calculates the average gray value of the grayed card image and then searches through the template information of various cards stored in the database to find template information which matches the calculated average gray value. The "matched" template refers to when the calculated average gray value is the same as the recorded average gray value of a piece of template information in the database. In some embodiments, the matched template refers to when the difference between the calculated average gray value and the recorded average gray value is within a predetermined range.

If the server finds more than one matched template based on the average gray value, the server can continue matching based on the UnionPay logo. Specifically, for each piece of currently matched template information, based on the location of the UnionPay logo recorded in the template information in the card image and the size of the UnionPay logo image, the server can perform graphic matching on the card image and the UnionPay logo image in the template information. The server matches the pixel points one by one. When the number or proportion of successfully matched pixel points reaches a predetermined threshold (e.g., the ratio of the number of successfully matched pixel points in the total number of all pixel points of the UnionPay logo image exceeds 70%), the server selects the card template corresponding to the card image as the identified card template. The server then extracts the location information of the number image area from multiple pieces of area location information included in the identified card template. Based on the extracted location information, the server can obtain the rectangular image area that includes the number information.

To determine the rectangular image area based on the second method, the server uses an edge detection algorithm. The image area that includes the number information contains rich edges with obvious differences from the other areas in the card image. The "edge" refers to a set of pixel points with surrounding pixel grays having step changes or roof changes, and the "edge detection" refers to extracting a set of the pixel points by using an algorithm based on the boundary of a main body object and a background in the image. Specifically, the server can perform a search-based edge detection algorithm by calculating the edge strength based on a first-order derivative expression. The server can also perform a zero-crossing based edge detection algorithm by searching for zero crossings in a second-order derivative expression.

In some embodiments, the server performs the first-order derivative expression on the vertical edge of the image based on a Prewitt operator. The server determines the approximate location of the number area based on the shape of the obtained area with relatively dense edge points and the distribution character of the edge points. The server selects a critical point for horizontal segmentation based on the maximum value and the minimum value of the vertical coordinates of the edge points in the obtained area. For example, the server can determine the locations of the upper boundary and the lower boundary of the number information included in the card image. Subsequently, the server can identify a zonal image area from the card image based on the upper and lower boundary location, thereby allowing the server to determine the rectangular image area that includes the number information.

Next, based on the determined rectangular image area that includes the number information, the server identifies the number information in the rectangular image area (operation 403). This operation includes the following three steps: (a) vertical segmentation; (b) feature value extraction; and (c) character identification based on the extracted feature value. In the first step (a) of identifying the number information (vertical segmentation), the server segments or divides the rectangular image area vertically based on an edge detection algorithm. Note that there is a certain space between two adjacent numbers contained in the number information, and that there are no general or consistent edge points of the space. Thus, the server uses operators to perform the edge detection algorithm on the determined rectangular area that includes the number information, and to detect edge points. The server calculates and analyzes the detected edge points based on the coordinate values of the edge points and the project features of number characters, and obtains the critical vertical segmentation point of each number image area containing identifiable numbers (e.g., numbers to be verified or identified). Subsequently, the server segments the image vertically to obtain multiple identifiable number images, such that each identifiable number image includes an identifiable number (e.g., a number to be verified or identified). In some embodiments, the operators used for performing the edge detection algorithm are as follows:

$$\text{A horizontal operator is: } \begin{bmatrix} -1 & 0 & 1 \\ -2 & 0 & 2 \\ -1 & 0 & 1 \end{bmatrix}$$

$$\text{A vertical operator is: } \begin{bmatrix} -1 & -2 & -1 \\ 0 & 0 & 0 \\ 1 & 2 & 1 \end{bmatrix}$$

Operators different from these exemplar operators can be used to perform the edge detection algorithm. In addition, the server can segment the number images based on other techniques.

In the second step (b) of identifying the number information (feature value extraction), the system identifies one or more feature values of each identifiable number image. For each identifiable number image, the server obtains the feature value of each identifiable number image based on processes such as binarization, denoising, reshaping, and luminance parameter extracting.

The system extracts the gray value of each pixel point in the identifiable number image, and counts and analyzes the extracted gray value. Because the gray value of the pixel point in the background image is generally within a certain range and the gray value of the pixel point in the number part of the image main body is also within a certain range, the server can select a threshold capable of distinguishing the value ranges of the two images (e.g., the background image and the number part of the image main body). The server performs binarization on the identifiable number image based on the selected threshold to form a corresponding binary matrix, such that the value of a pixel with a gray value less than the threshold in the matrix is set to "True," and the value of a pixel with a gray value greater than the threshold in the matrix is set to "False."

The server can also perform a denoising process based on the binary matrix. The system determines a set of "black" pixel points (e.g., pixel points with a value of "True") and eliminates isolated black pixel points. In other words, the values corresponding to the isolated black pixel points are whitened to "white" to eliminate the influence of noise on image processing. This process is known as a low-pass filtering denoising process. The server then obtains a screenshot of the identifiable number image based on the obtained black point set ("target point set"). The server extracts an image that contains the target point set and performs a standardized compression process on the extracted image. The compression process creates an image with a size that is the same as the size of a stored sample number image. For example, the size of the stored sample number image can be 10*13 pixels.

The server can then extract a luminance parameter set of the image that contains the target point set. The extracted luminance parameter set is used as the feature value of the identifiable number image. Parameters contained in the luminance parameter set can include a maximum luminance, a minimum luminance, an average luminance, and a luminance standard variance. In some embodiments, because the card image is grayed in operation 401, the luminance is expressed by the gray value of each pixel point in the step, and the server calculates the parameter values of the extracted luminance parameter set. Parameters different from the above-mentioned parameters can be selected for use as the feature values of the identifiable number image, e.g., average hue value, average saturation value, and the like.

In the third step (c) of identifying the number information (character identification), the server performs character identification based on a classification algorithm. One example of a classification algorithm is the K-Nearest Neighbor (KNN) classification algorithm. The general concept of the KNN algorithm is that if most of k most similar samples to a sample in the feature space belong to a certain category, the sample belongs to this category and has the features of the samples in the category. The server can use the KNN algorithm to identify the characters in the identifiable number image.

In some embodiments, the server uses a simplified "k=1" nearest neighbor algorithm. For example, feature sets of nine sample number images of the numbers 0-9 can be generated in advance, where the feature set of each sample number image contains the corresponding value (the feature value of the sample number image) of each parameter in the luminance parameter set described above. The server calculates a distance set D<$d_i$> of the feature values of the identifiable number image and the feature values of each sample number image based on the following formula, where i∈[0, 9]:

$$d_i = \sum_{j=0}^{j<number\ of\ sample\ feature\ values} (x_j - ci_j)^2 \qquad \text{(Equation 2)}$$

In Equation 2, $d_i$ refers to the distance relative to the feature value of the $i^{th}$ sample number image, $ci_j$ refer to the value of the $j^{th}$ feature value of the $i^{th}$ sample number image, and $x_j$ refers to the value of the $j^{th}$ feature value of the identifiable number image. In this calculated distance set, the feature value of the sample number image corresponding to the minimum $d_i$ is the nearest neighbor of the feature value of the identifiable number image, so the server determines that the characters contained in the identifiable number image are consistent with the characters in the sample number image. Thus, the server identifies the characters contained in the identifiable number image.

The server performs the above described character identification on each identifiable number image, identifies the numbers contained in each identifiable number image one by one, and serially connects or appends the numbers together based on their respective location in the card image to obtain the number information or number feature of the card image.

Extracting a Pattern Feature

FIG. 5 presents a flowchart illustrating an operation performed by an application server for extracting a pattern feature from a card image, in accordance with an embodiment of the present application. Note that the size of the verifiable card image may not be the same as the size of the registered card image. To improve the efficiency and accuracy of image processing, the server can first normalize the size of the card image based on a predetermined size (operation 501). In some embodiments, the size of the card image is adjusted to 170*108 pixels. Also, the server can use a "cvResize( )" function provided by an openCV database or other similar functions to adjust the size of the card image. In addition, to reduce the amount of subsequent processing, the server can convert the image into a grayscale image (as describe above in relation to operation 401 of FIG. 4) before adjusting the size of the image.

Next, the server extracts a predetermined number of image blocks from the normalized card image based on a predetermined position and a predetermined size (operation 502). In some embodiments, the pattern feature of the card image is obtained based on the dictionary learning method. Thus, a predetermined number of image blocks are extracted in advance. In order to accurately match the pattern features extracted from both the registered card and the verifiable card, the server can select the same number of image blocks with the same size from the same location of the card images. For example, the size of the image blocks can be 8*8, 16*16, and the like.

The server then assigns a pixel value for each of the predetermined number of image blocks based on a sample set normalization for a respective image block (operation 503). Sample set normalization is used to facilitate subsequent data processing operations and to prevent singular sample data in the sample data from resulting in either convergence failure or significantly slowing down the convergence speed of subsequent algorithms and training processes. More specifically, sample set normalization is used to assign a value that is within a specific range to each pixel in the image block. For example, the gray values or the RGB component values of the pixel can be normalized to be within a range of 0-1.

The server then determines a local feature for the respective image block based on the dictionary learning method (operation 504). Before determining the local feature based on the dictionary learning method, the server can perform a whitening process. Because neighboring pixel values in the image block generally have strong correlation (e.g., redundant information exists), the correlation can be removed by the whitening operation, which reduces the amount of data inputted to the subsequent dictionary learning process and also improves the processing efficiency. In some embodiments, the server uses a Principal Component Analysis (PCA) method to perform the whitening processing. For example, the server can use the "cvCalcPCA( )" function provided by an openCV database or other similar functions to perform the whitening process.

In determining the local feature based on the dictionary learning method, the server can first extract the feature vectors of the image blocks. In some embodiments, the server can extract the feature vector based on a Scale-Invariant Feature Transform (SIFT) algorithm. The SIFT algorithm is an image feature extracting and matching algorithm. SIFT features are invariable in the case of translation, rotation, scale change, and illumination change of the image. The SIFT algorithm provides a stable feature-matching capacity on visual angle change and affine transformation. The essence of the SIFT algorithm is a process of extracting key points (also called feature points) from the image. The process generally includes the following four steps:
  i) The extreme value of a scale space is detected to determine the locations and scales of key points;
  ii) The key points are determined by creating a SIFT candidate key point set. The key points with low contrast ratios (that is, pixels without an obvious difference with surrounding pixels) and unstable edge points are removed from the SIFT candidate key point set;
  iii) The direction parameter of each key point is determined based on the gradient direction distribution characteristic of neighboring pixels of the key points to assign rotation invariability to the operators; and
  iv) SIFT feature vectors are generated. The SIFT feature vectors are generated based on the coordinates, scales, and directions of the determined key points.

The server can extract the feature vectors of each image block based on these steps. For example, the server can use a FeatureDetector type "detect( )" method provided by an OpenCV database to extract the SIFT feature vectors of the image block.

After the server extracts the feature vectors of each image block based on the SIFT algorithm, the server determines a group of over-complete bases for the feature vectors based on a sparse coding model. The server can generate a dictionary and encode the feature vectors based on the dictionary to obtain the linear expression of the feature vectors in the dictionary. Thus, based on the dictionary generated using the SIFT algorithm, the linear expression can be the local feature of the image block.

Finally, the server identifies an image feature of the card image based on the local feature and a pooling technology (operation 505). The identified image feature is used as the pattern feature of the card. Upon obtaining the local features of the image blocks, the server can combine the local features to obtain the pattern feature which characterizes the integral feature of the card image.

To simplify the description of the pattern feature and maintain a specific invariance property (such as, rotation, translation, extension and the like) of the pattern feature, the server can process the pattern feature based on a pooling technology. Since the image has a static attribute, a particular feature of an image block has a high likelihood of being equivalently applicable to another image block. In order to simplify the description of the image feature, the server can aggregate and count the features at different locations. Specifically, the server obtains a new feature by calculating the average value or integrating the maximum values of the features within a small neighborhood. This technique is known as "pooling," and can be either average pooling technology or a maximum pooling technology based on different aggregation and counting methods. The server can use a pooling technology to determine the pattern feature of the card based on the obtained local features of the image blocks.

Upon extracting and determining the pattern feature of the registered card, the server can store the generated dictionary in a dictionary file. Upon extracting the pattern feature of the verifiable card, the server is not required to generate a new dictionary. Instead, the server can use the previously generated dictionary stored in the dictionary file (e.g., generated while extracting and determining the pattern feature of the registered card) to determine the pattern feature of the verifiable card.

Extracting a Material Feature

Figure 6:
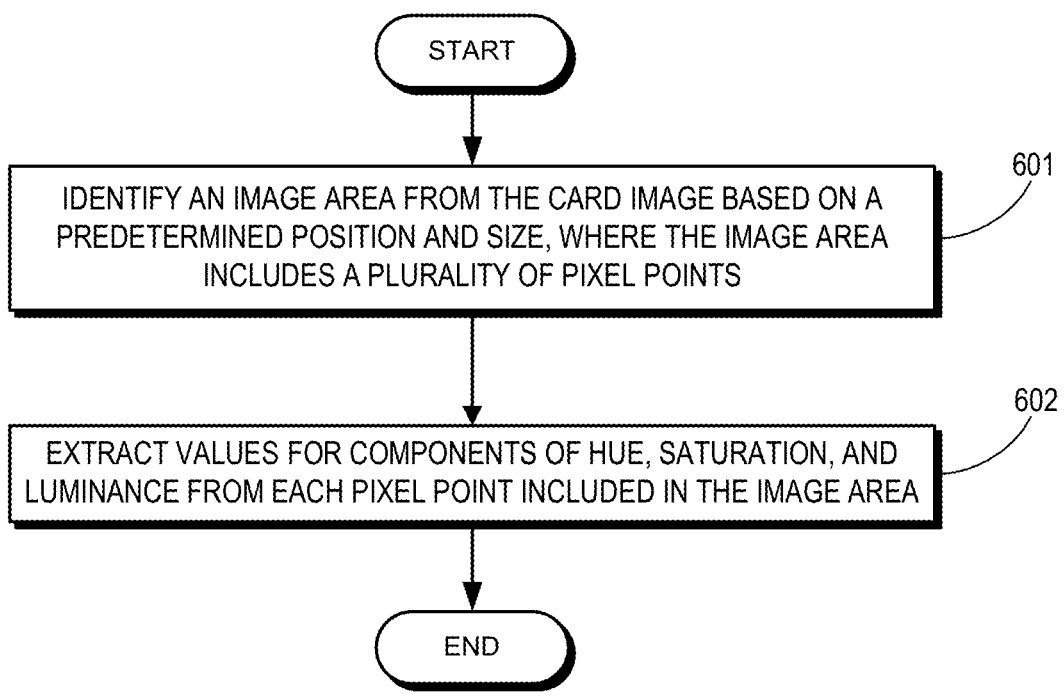
FIG. 6 presents a flowchart illustrating an operation performed by an application server for extracting a material feature from a card image, in accordance with an embodiment of the present application.

FIG. 6 presents a flowchart illustrating an operation performed by an application server for extracting a material feature from a card image, in accordance with an embodiment of the present application. During operation, the server identifies an image area from the card image based on a predetermined position and a predetermined size, where the image area includes a plurality of pixel points (operation 601). The server extracts data related to the card material from an image in the image area. For example, if the size of the card is w*h pixels, an image area with a size of (1/20)w*(1/10)h is identified from the top right corner of the card image based on the predetermined location and size for use as the material extraction area.

Next, the server extracts values for components of hue (H), saturation (S), and intensity (I) (together, "HSI") from each pixel point included in the image area (operation 602). The extracted component values are used as the data related to the card material. Hue, saturation, and intensity are three parameters used to describe color features of an object based on an HSI color space model. Different surface structures, irradiation light sources, and visual physiological characteristics can influence these three parameters. For example, under natural light with differing intensity (or luminance), the pixel points on the surfaces of objects made from the same material are distributed on approximately identical color space curved surfaces, while the pixel points on the surfaces of objects made from different surface materials are distributed on different color space curved surfaces. In some embodiments, the server extracts the values of the components hue, saturation, and intensity of each pixel point from the image of the material extraction area based on this principle. The server then uses the extracted component values as the data for the card material.

In addition, each pixel point in the card image is generally described based on red (R), green (G), and blue (B) components (e.g., an RGB color space). An HSI color space and an RGB color space have a specific corresponding relationship, and each color space can be converted into the other color space. Therefore, in some embodiments, corresponding HSI component values can be converted based on the corresponding relationship and the RGB component values of each pixel point in the material extraction area. The server can also use an "rgb2hsv( )" interface provided by matlab to obtain the values of the components hue, saturation, and intensity, and to subsequently obtain the data related to the card material (e.g., the material feature from the card image).

Extracting a Graphic Feature

Figure 7:
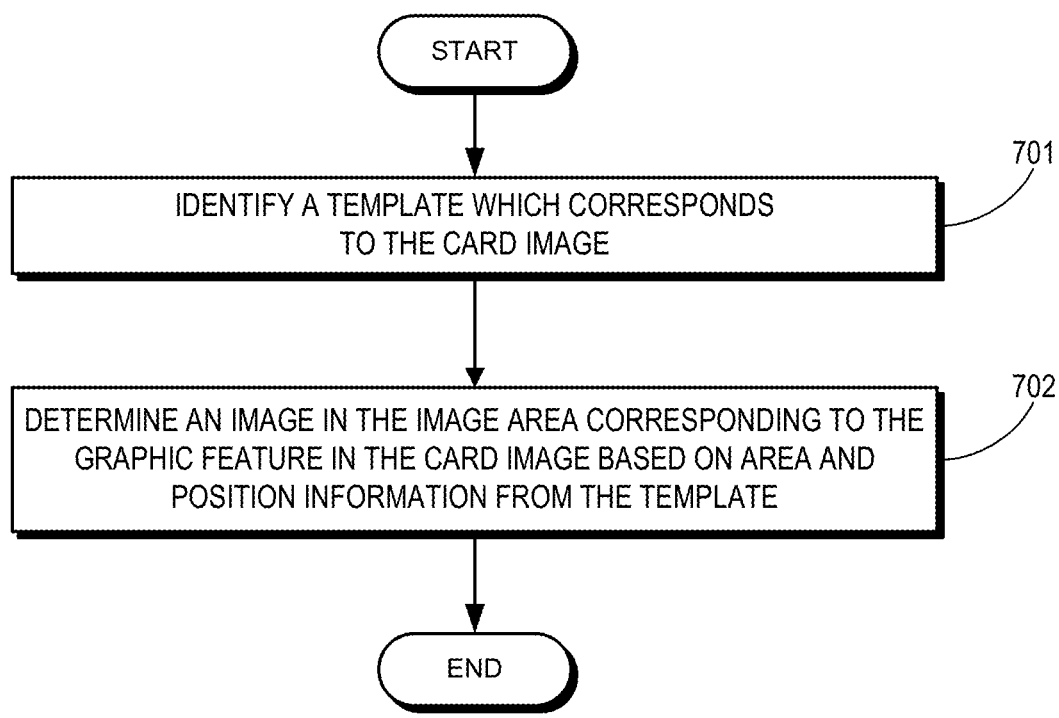
FIG. 7 presents a flowchart illustrating an operation performed by an application server for extracting a graphic feature from a card image, in accordance with an embodiment of the present application.

FIG. 7 presents a flowchart illustrating an operation performed by an application server for extracting a graphic feature from a card image, in accordance with an embodiment of the present application. During operation, the server identifies a template which corresponds to the card image (operation 701). The template (e.g., card template) can be a template which is stored in the database, and can be identified based on a process similar to the one described in relation to operation 402 of FIG. 4.

Next, the server determines an image in the image area corresponding to the graphic feature in the card image based on area and position information from the template (operation 702). As mentioned above, the graphic feature can include one or more of a character feature, a logo feature, and a signature feature. For example, to obtain the signature feature, the server reads the location information of the signature area from the area location information of the card template, and identifies an image from the card image based on the location information. The identified image is the obtained signature area image, and is the signature feature of the graphic feature.

Determining Whether Card Features Match

Figure 8:
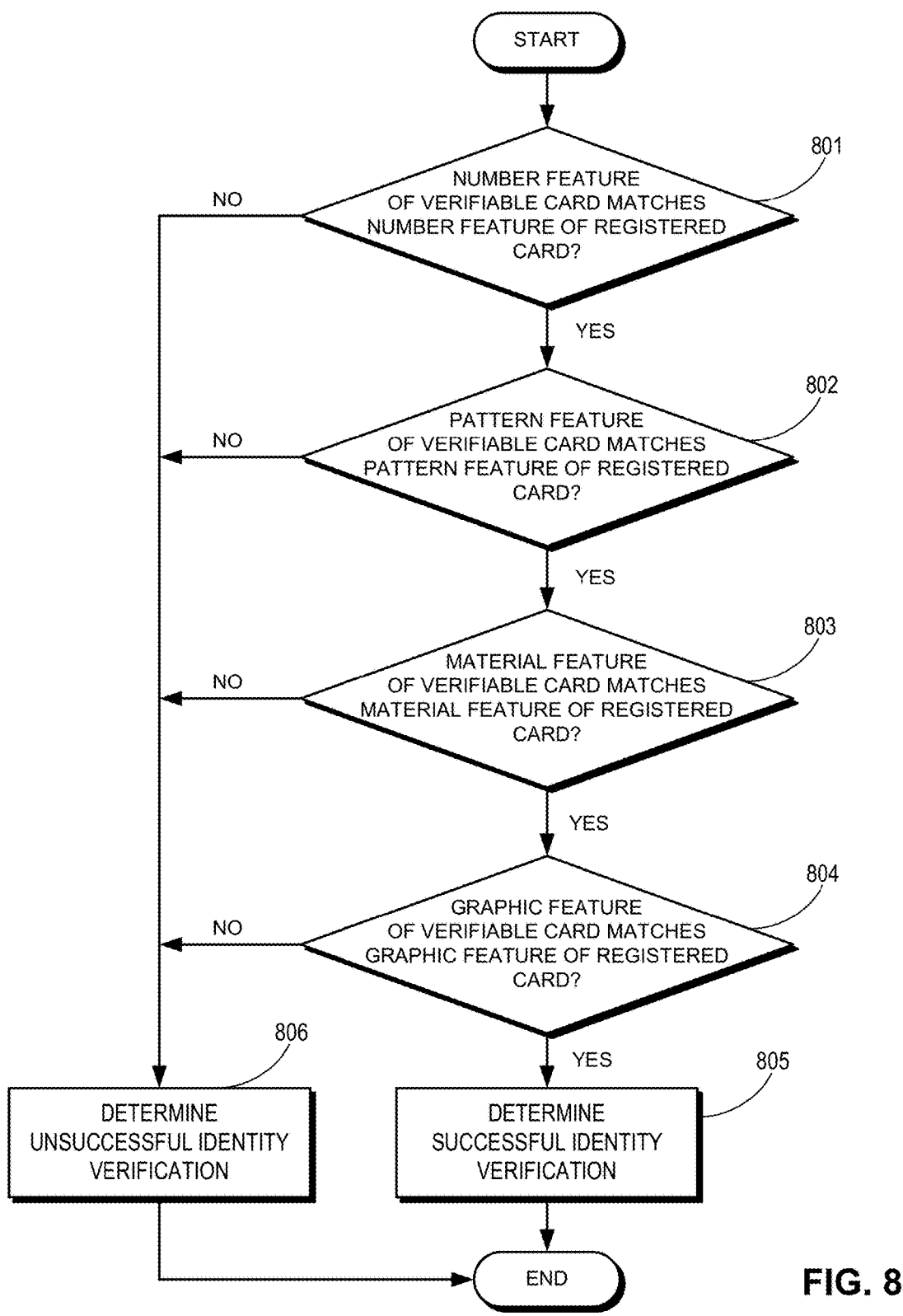
FIG. 8 presents a flowchart illustrating an operation performed by an application server for determining whether the card features of the verifiable card match the corresponding card features of the registered card, in accordance with an embodiment of the present application.

FIG. 8 presents a flowchart illustrating an operation performed by an application server for determining whether the card features of the verifiable card match the corresponding card features of the registered card, in accordance with an embodiment of the present application.

Determining Whether Number Features Match

During operation, the server determines whether the number feature of the verifiable card matches the number feature of the registered card (operation 801). Based on the account information of a user or client computing device that sends a request for identify verification, the server extracts the stored number feature of the registered card from a database or other storage system. If the stored number is encrypted, the encrypted stored number is decrypted by using a decryption algorithm based on the encryption algorithm. These operations related to extracting and decrypting encrypted stored card features can also be performed as part of operations 802, 803, and 804.

The server compares the number feature of the registered card image with the number feature extracted from the verifiable card image (as described in operation 301 of FIG.

3). The number feature can be a string of numbers, so the server can use a character string comparison. If the result of the comparison is that the two features are the same, the server determines that the number feature of the verifiable card matches the number feature of the registered card and proceeds to the next feature matching operation (e.g., operation 802). If not, the server determines unsuccessful identity verification (operation 806).

Determining Whether Pattern Features Match

The server can determine whether the pattern feature of the verifiable card matches the pattern feature of the registered card (operation 802). If the pattern features of the verifiable card and the registered card are generated based on the dictionary learning method (as described above in relation to FIG. 5), the server can determine whether the pattern features match by calculating the Euclidean or logical distance between the pattern feature of the verifiable card and the pattern feature of the registered card. The Euclidean distance can be used to characterize the similarity of pattern images which correspond to the verifiable card pattern feature and the registered card pattern feature. In some embodiments, the server can calculate the Euclidean distance between the pattern features of the verifiable card and the registered card based on a "pdist( )" interface function provided by matlab. Next, the server determines whether the calculated logical or Euclidean distance is greater than a predetermined threshold. If so, the server determines that the pattern feature of the verifiable card matches the pattern feature of the registered card, and proceeds to the next feature matching operation (e.g., operation 803). If not, the server determines unsuccessful identity verification (operation 806).

If the pattern features of the registered card and the verifiable card are extracted based on the SIFT algorithm (as described above in relation to operation 504 of FIG. 5), the server can determine whether the pattern features match by calculating, for each feature point of the pattern feature of the verifiable card, the Euclidean or logical distance between the corresponding feature vector of the verifiable card and a vector of the registered card that corresponds to the respective feature points of the pattern feature of the registered card. The server selects two feature points with a first smallest Euclidean distance and a second smallest Euclidean distance. If the ratio of first Euclidean distance to the second Euclidean distance is smaller than a preset threshold, the server determines that the current feature point of the pattern feature of the verifiable card successfully matches the feature point corresponding to the first smallest Euclidean distance in the pattern feature of the registered card. In response to determining this successful match, the server increases a count of successfully matched feature points. When the count satisfies a predetermined threshold, the server determines that the pattern feature of the verifiable card matches the pattern feature of the registered card, and proceeds to the next feature matching operation (e.g., operation 803). If not, the server determines unsuccessful identity verification (operation 806).

Determining Whether Material Features Match

The server also determines whether the material feature of the verifiable card matches the material feature of the registered card (operation 803). As described above in relation to operation 602 of FIG. 6, under natural light with differing intensity (or luminance), the pixel points on the surfaces of objects made from the same material are distributed on approximately identical color space curved surfaces, while the pixel points on the surfaces of objects made from different surface materials are distributed on different color space curved surfaces. The server determines whether the material features of the verifiable card and the registered card match based on the operations described below in relation to FIG. 9.

Figure 9:
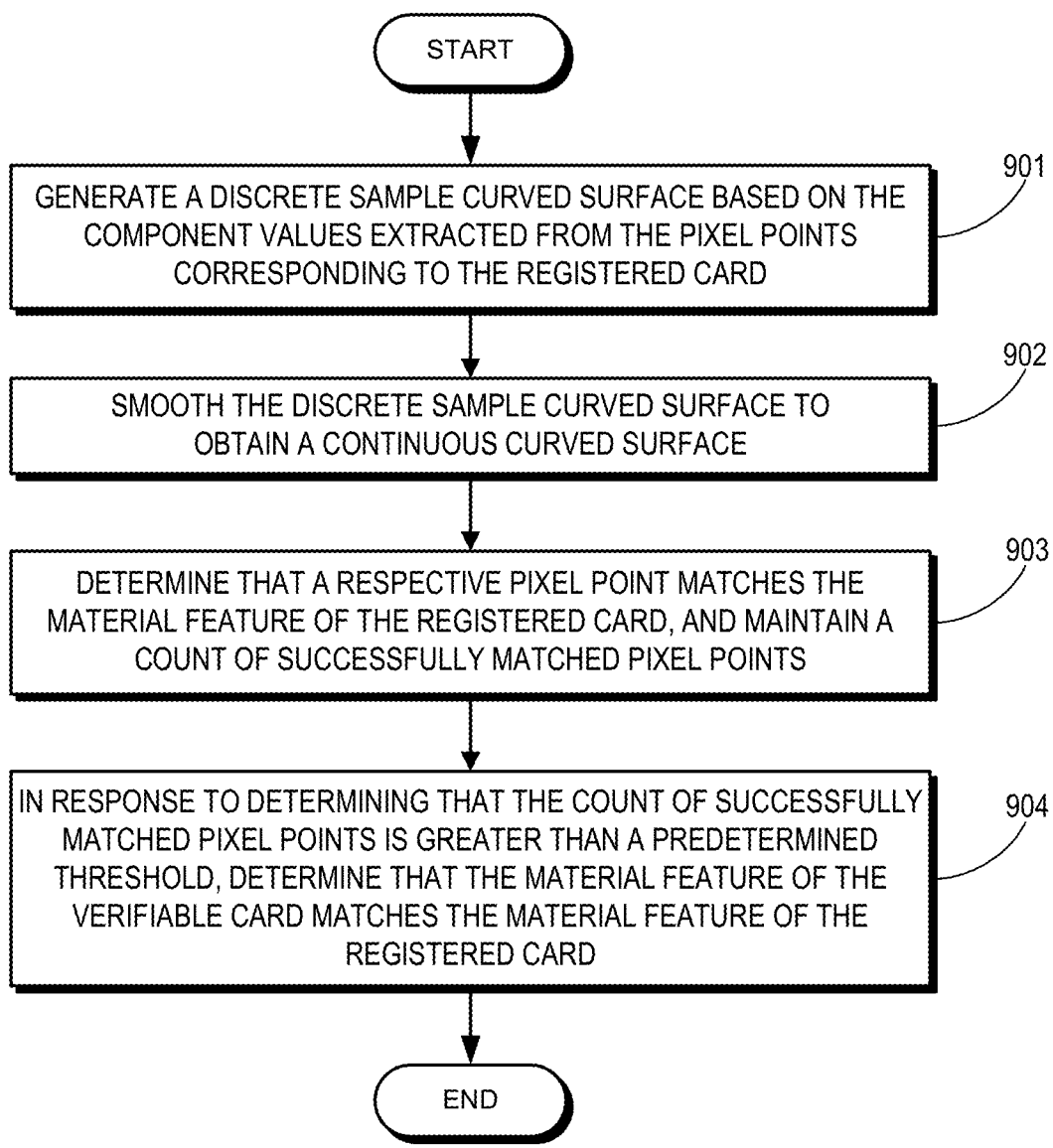
FIG. 9 presents a flowchart illustrating an operation performed by an application server for determining whether the material feature of the verifiable card matches the corresponding material feature of the registered card, in accordance with an embodiment of the present application.

FIG. 9 presents a flowchart illustrating an operation performed by an application server for determining whether the material feature of the verifiable card matches the corresponding material feature of the registered card, in accordance with an embodiment of the present application. During operation, the server generates a discrete sample curved surface based on the component values extracted from the pixel points corresponding to the registered card (operation 901). The component values can be the values of components hue (H), saturation (S), and intensity (I) of pixel points in the material feature of the registered card, where one of the component values is predetermined to be a vertical coordinate and the other two component values are predetermined to be horizontal coordinates.

When the saturation of an object of the same material and the same chroma reaches an upper limit, the saturation does not increase with a decrease of intensity (or luminance). The server can use the intensity component as the vertical coordinate of the discrete sample curved surface. However, this may result in an error. Alternatively, the server can use the hue and intensity components as the horizontal coordinates of the discrete sample curved surface and the saturation component as the vertical coordinate. This can result in a relatively accurate calculation. Thus, the saturation component is used as the vertical coordinate to describe the following operations.

Next, the server smoothes the discrete sample curved surface to obtain a continuous curved surface (operation 902). The continuous curved surface can be obtained by training a neural network. Specifically, the neural network can be trained by using the values of the hue component and the intensity component of each pixel point in the material feature of the registered card as the training data input of the neural network, and by using the value of the saturation component as the training data output. This allows the server to obtain the continuous network.

Training the neural network may take a long time. In addition, ensuring accuracy and precision may be difficult. In some embodiments, the discrete sample curved surface can be converted into a continuous sample curved surface based on the concept of structural elements in mathematical morphology, which is a technique used to analyze and process geometrical structures. The server can analyze the distribution condition of the pixel points surrounding the blank pixel points in the discrete sample curved surface. When the distribution of the surrounding pixel points satisfies a specific requirement, the server can use the average value of the pixel values of the surrounding pixel points as the pixel values of the blank pixel points. This process of filling the blank points allows the server to obtain the continuous curved surface.

Next, the server determines that a respective pixel point matches the material features of the registered card and maintains a count of successfully matched pixel points (operation 903). For each pixel point in the material feature of the verifiable card, the server calculates the minimum distance d between the saturation component value of the pixel point and the continuous curved surface. The value of the difference l and the minimum distance d is used as the similarity coefficient of the pixel point. The server determines whether the similarity coefficient satisfies a predetermined threshold. If it does, the server determines that the pixel point matches the material feature of the registered card, and the server increases and maintains a count of successfully matched pixel points. For example, the predetermined threshold for the similarity coefficient can be 0.9, such that if the similarity coefficient of a pixel point in the material feature of the verifiable card is greater than 0.9, the server determines that the pixel point matches the material feature of the registered card and increases the count of successfully matched pixel points.

Finally, in response to determining that the count of successfully matched pixel points is greater than a predetermined threshold, the server determines that the material feature of the verifiable card matches the material feature of the registered card (operation 904). Returning to FIG. 8, the server determines that the material feature of the verifiable card matches the material feature of the registered card (operation 803), and proceeds to the next feature matching operation (e.g., operation 804). If the server determines that the material feature of the verifiable card does not match the material feature of the registered card, the server determines unsuccessful identity verification (operation 806).

Determining Whether Graphic Features Match

The server determines whether the graphic feature of the verifiable card matches the graphic feature of the registered card (operation 804 of FIG. 8). The server can use a graphic comparison method to determine whether the pixel value of a pixel point from the verifiable card is the same as the pixel value of a corresponding pixel point from the registered card. Specifically, the image size corresponding to the graphic feature of the verifiable card is first adjusted to a size that is equal to the size of the corresponding image of the registered card. Then, for each pixel point in the image area of the verifiable card, the server compares whether the pixel value for a respective pixel point is the same as the pixel value of the corresponding pixel point in the corresponding image of the registered card. For a color image, the server extracts the RGB components and compares the respective pixel points. For a grayscale image, the server directly extracts the gray value for comparison of the respective pixel points. If the comparison results in a match, indicating that the two currently compared pixel points are identical, the server increases and maintains the number of identical pixel points. Subsequently, in response to determining that the count of successfully matched pixel points is greater than a predetermined threshold, the server determines that the graphic feature of the verifiable card matches the graphic feature of the registered card. If not, the server determines unsuccessful identity verification (operation 806).

If the server determines a successful result from operations 801-804 above (e.g., the card features of the verifiable card match the card features of the registered card), the server determines successful identity verification (operation 805). As described above, the server can extract one or more verifiable card features. In addition, the operations described in relation to FIG. 8 can occur in a different order with a different number of operations (e.g., one or more of depicted operations 801-804). Hence, if each of the verifiable card features matches the corresponding registered card feature, the server returns successful identity verification to the client computing device. If any single verifiable card feature does not match the corresponding registered card feature, the server returns unsuccessful identity verification to the client computing device.

Role of Client Computing Device

Figure 10:
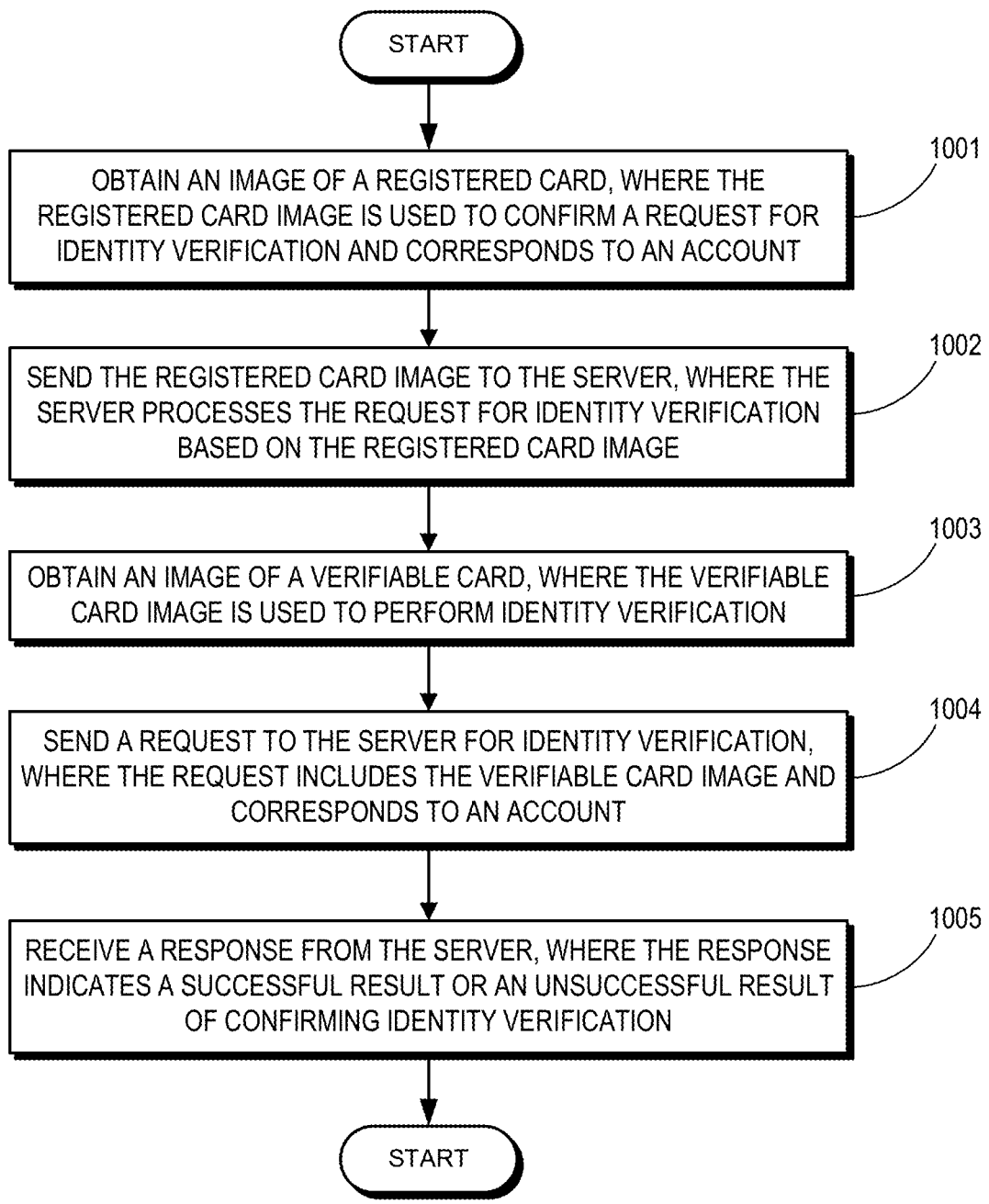
FIG. 10 presents a flowchart illustrating an operation performed by a client computing device for facilitating secure identity verification, in accordance with an embodiment of the present application.

FIG. 10 presents a flowchart illustrating an operation performed by a client computing device for facilitating secure identity verification, in accordance with an embodiment of the present application. During operation, a client computing device obtains an image of a registered card, where the registered card image is used for identity verification and corresponds to an account (operation 1001). The client device provides the registered card image to the application server for use in the registration process, as described above in relation to FIG. 2. For client devices with cameras (e.g., personal computers, smartphones, and the like), the registered card image can be obtained based on a card photographing mode. For other client devices and under different application scenarios, the registered card image can be obtained based on different modes. For example, for personal computer web pages with cameras, a CAB packet mode (e.g., ImageCapOnWeb.cab) can be used to obtain the registered card image by invoking a local ActiveX control. For client devices such as smartphones, a software development kit (SDK) or an interface provided by the system can be invoked to obtain the registered card image. For example, for an Android mobile phone, related interfaces in the Camera API provided by the system can be invoked to achieve the above-mentioned function.

The front surface of the card can include a main image or card information such as a bank card number, a bank name, a logo, and the like. The back surface of the card can include a signature image area. The client device can obtain the front surface image, the back surface image, or both the front and back surface images of the card. Providing both the front and back surface images of the card can result in more complete data for subsequent identity verification by the application server.

Next, the client device sends the registered card image to the application server (operation 1002). The registered card image is associated with a specific account of a user, so the client device can also send information relating to the specific user account. The server can extract, encrypt, and store card features of the registered card image (along with the specific account information) for use in a subsequent identity verification request.

The client device then obtains an image of a verifiable card, where the verifiable card image is used for identity verification (operation 1003). The operation of obtaining the verifiable card image is similar to the step of obtaining the registered card image, as described above in relation to operation 1001. The front and/or back surface image of the verifiable card can also be obtained in a similar fashion as for the registered card, as described above in relation to operation 1001.

Next, the client device sends a request for identity verification to the application server, where the request includes the verifiable card image and corresponds to an account (operation 1004). The request can include information relating to the specific account of a user of the client device, and the application server can extract a corresponding registered card feature based on the account information included in the request.

Finally, the client device receives a response from the application server, where the response indicates successful or unsuccessful identity verification (operation 1005). If the client device receives a successful result, the client device may be authorized to continue performing subsequent transactions (e.g., financial transactions such as online payment of bills). In some embodiments, the client device can prompt the user of the device to perform additional identity verification, such as entering information corresponding to the card (e.g., a password or pass code for the account). If the client device receives an unsuccessful result, the user of the device may not be holding an authentic physical card corresponding to the account and may be prohibited from performing subsequent transactions. In this manner, the system provides a method which increases the security of identity verification for online transactions.

Exemplary Computer and Communication Systems

Figure 11:
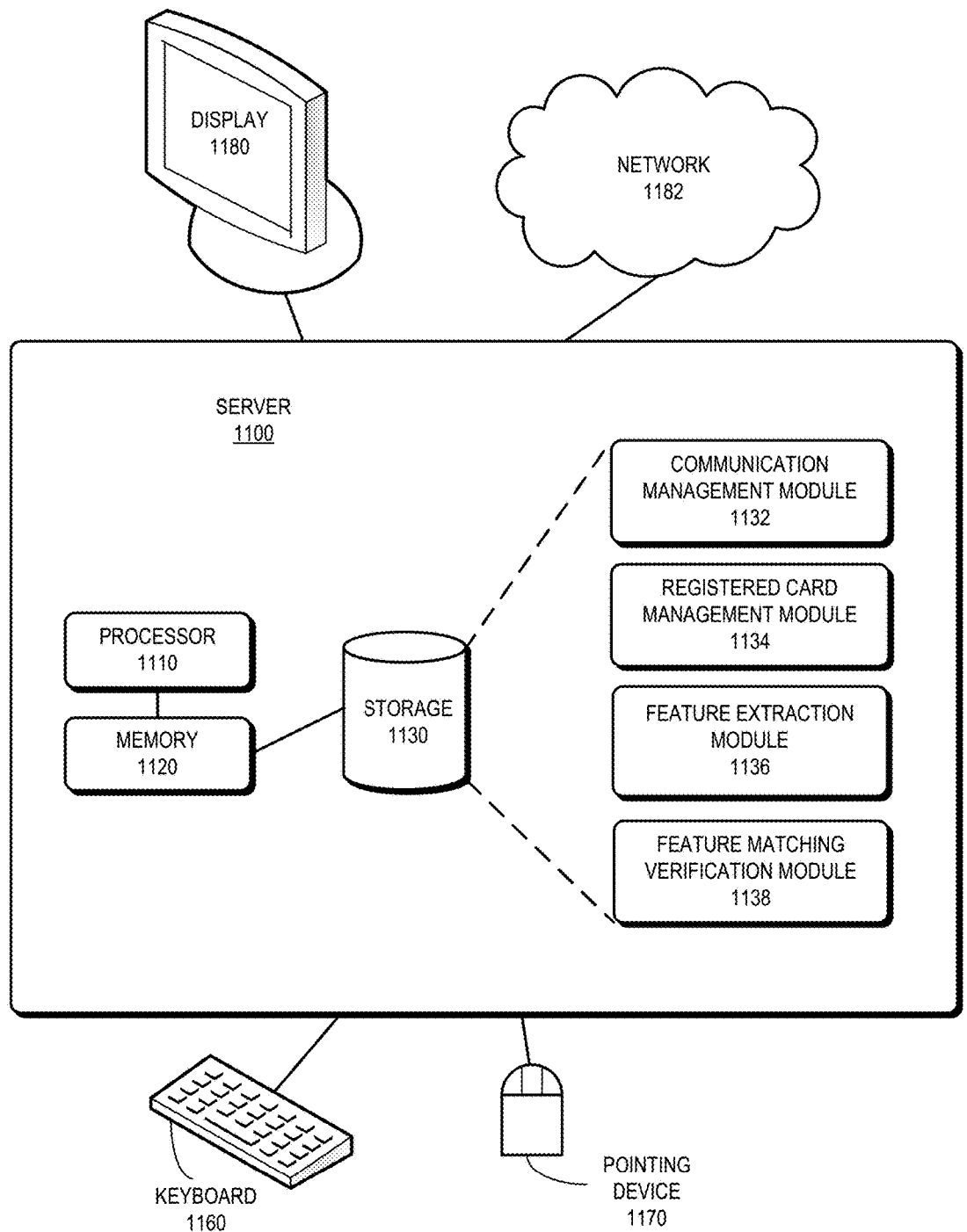
FIG. 11 illustrates an exemplary server that facilitates secure identity verification, in accordance with an embodiment of the present application.

FIG. 11 illustrates an exemplary server 1100 that facilitates secure identity verification, in accordance with an embodiment of the present invention. In this example, server 1100 includes a processor 1110, a memory 1120, and a storage device 1130. Storage 1130 typically stores instructions that can be loaded into memory 1120 and executed by processor 1110 to perform the methods described above. In one embodiment, the instructions in storage 1130 can implement a communication management module 1132, a registered card management module 1134, a feature extraction module 1136, and a feature matching verification module 1138, all of which can communicate with each other through various means.

In some embodiments, modules 1132, 1134, 1136, and 1138 can be partially or entirely implemented in hardware and can be part of processor 1110. Further, in some embodiments, the system may not include a separate processor and memory. Instead, in addition to performing their specific tasks, modules 1132, 1134, 1136, and 1138, either separately or in concert, may be part of special-purpose computation engines.

Storage 1130 stores programs to be executed by processor 1110. Specifically, storage 1130 stores a program that implements a system (application) for facilitating secure identity verification based on features of a card. During operation, the application program can be loaded from storage 1130 into memory 1120 and executed by processor 1110. As a result, server 1100 can perform the functions described above. Server 1100 can be further coupled to an optional display 1180, a keyboard 1160, and a pointing device 1170, and can be coupled via one or more network interfaces to a network 1182.

During operation, communication management module 1132 receives an image of a registered card which corresponds to an account. Feature extraction module 1136 extracts a card feature from the registered card image for use as a registered card feature, and registered card management module 1134 stores the registered card feature.

Communication management module 1132 receives a request for identity verification, where the request corresponds to an account and includes an image of a verifiable card. Feature extraction module 1136 extracts a card feature from the verifiable card image for use as a verifiable card feature. In response to determining that the verifiable card feature matches a corresponding card feature of a registered card of the account, feature matching verification module 1138 determines successful identity verification.

Registered card management module 1134 can encrypt the registered card feature based on an encryption algorithm, and store the encrypted registered card feature. Registered card management module 1134 can also decrypt the encrypted registered card feature based on a decryption algorithm which corresponds to the encryption algorithm. Feature matching verification module 1138 can then determine that the verifiable card feature matches the decrypted registered card feature. Feature matching verification module 1138 can also determine that each of one or more verifiable card features matches a corresponding one or more registered card features.

Feature extraction module 1136 can extract number information from the corresponding card image, where the number information is the number feature of the corresponding card. Feature extraction module 1136 converts the card image into a grayscale image and determines a rectangular image area from the grayscale image that includes the number information. Feature extraction module 1136 identifies the number information in the rectangular image area. In response to determining that the number information from the verifiable card feature matches the number information from the registered card feature, feature matching verification module 1138 determines that the number feature of the verifiable card matches the number feature of the registered card.

Furthermore, feature extraction module 1136 can identify a template which corresponds to the card image, and determine the rectangular image area based on area and position information from the template. Feature extraction module 1136 can also segment the card image horizontally based on an edge detection algorithm, and determine the rectangular image area based on the segmented card image.

In identifying the number information in the rectangular image area, feature extraction module 1136 segments the rectangular image area vertically based on an edge detection algorithm. Feature extraction module 1136 determines a plurality of images of numbers based on the segmented rectangular image area, where each of the number images is an identifiable number image that includes an identifiable number. Feature extraction module 1136 identifies one or more feature values for each identifiable number image. For each of one or more sample number images stored by the server, feature extraction module 1136 calculates a logical distance between the feature value for a respective identifiable number image and a corresponding feature value for the sample number image based on a classification algorithm. In response to selecting one of the sample number images based on a shortest calculated logical distance, where the selected sample number image includes a number, feature matching verification module 1138 determines that the identifiable number included in the identifiable number image is the number included in the selected sample number image.

Feature extraction module 1136 can further extract the pattern feature from the corresponding card image based on two methods. In the first method of pattern feature extraction, feature extraction module 1136 normalizes a size of the card image based on a predetermined size. Feature extraction module 1136 extracts a predetermined number of image blocks from the normalized card image based on a predetermined position and a predetermined size. Feature extraction module 1136 assigns a pixel value for each of the predetermined number of image blocks based on a sample set normalization for a respective image block. Feature extraction module 1136 determines a local feature for the respective image block based on a dictionary learning method and identifies an image feature of the card image based on the local feature and a pooling technology. In addition, feature extraction module 1136 calculates a logical distance between the pattern feature of the verifiable card and the pattern feature of the registered card, where the logical distance indicates a similarity of pattern images which correspond to the verifiable card pattern feature and the registered card pattern feature. In response to determining that the calculated logical distance is greater than a predetermined threshold, feature matching verification module 1138 determines that the pattern feature of the verifiable card matches the pattern feature of the registered card.

In addition, feature extraction module 1136 can convert the card image into a grayscale image and can also perform a whitening process on the respective image block, where the whitening process removes a correlation between neighboring pixel values.

In the second method of pattern feature extraction, feature extraction module 1136 extracts one or more feature points of the card image based on an image detection algorithm, and generates one or more corresponding feature vectors of the card image based on the image detection algorithm. For each of the feature points of the pattern feature of the verifiable card, feature extraction module 1136 calculates a logical distance between the corresponding vector of the verifiable card and a vector of the registered card that corresponds to the respective feature point of the pattern feature of the registered card. In response to determining that a feature point of the verifiable card matches a feature point of the registered card based on the calculated logical distance, feature matching verification module 1138 increases a count of successfully matched feature points. In response to determining that the count of successfully matched feature points is greater than a predetermined threshold, feature matching verification module 1138 determines that the pattern feature of the verifiable card matches the pattern feature of the registered card.

Furthermore, feature extraction module 1136 can extract the material feature from the corresponding card image. Feature extraction module 1136 identifies an image area from the card image based on a predetermined position and a predetermined size, where the image area includes a plurality of pixel points, and extracts component values of hue, saturation, and luminance from each pixel point included in the image area. Feature extraction module 1136 also generates a discrete sample curved surface based on the component values extracted from the pixel points corresponding to the registered card, where one component value is predetermined to be a vertical coordinate and the remaining component values are predetermined to be horizontal coordinates. Feature extraction module 1136 smoothes the discrete sample curved surface to obtain a continuous curved surface. For each pixel point of the image area corresponding to a verifiable card, feature extraction module 1136 calculates a minimum distance between a component value of the pixel point and the continuous curved surface. In response to determining that the calculated minimum distance is greater than a predetermined threshold, feature matching verification module 1138 determines that the respective pixel point matches the material feature of the registered card and increases a count of successfully matched pixel points. In response to determining that the count of successfully matched pixel points is greater than a predetermined threshold, feature matching verification module 1138 determines that the material feature of the verifiable card matches the material feature of the registered card.

Additionally, feature extraction module 1136 can extract the graphic feature from the corresponding card image. Feature extraction module 1136 identifies a template which corresponds to the card image and determines an image in the image area corresponding to the graphic feature in the card image based on area and position information from the template. Feature extraction module 1136 adjusts a size of the determined image corresponding to the graphic feature of the verifiable card, where the adjusted size is equal to a size of the corresponding image of the registered card. For each of one or more pixel points in the adjusted size image of the verifiable card, in response to determining that a pixel value for a respective pixel point is equal to a pixel value for a corresponding pixel point in the corresponding image of the registered card, feature matching verification module 1138 increases a count of successfully matched pixel points. In response to determining that the count of successfully matched pixel points is greater than a predetermined threshold, feature matching verification module 1138 determines that the graphic feature of the verifiable card matches the graphic feature of the registered card.

Figure 12:
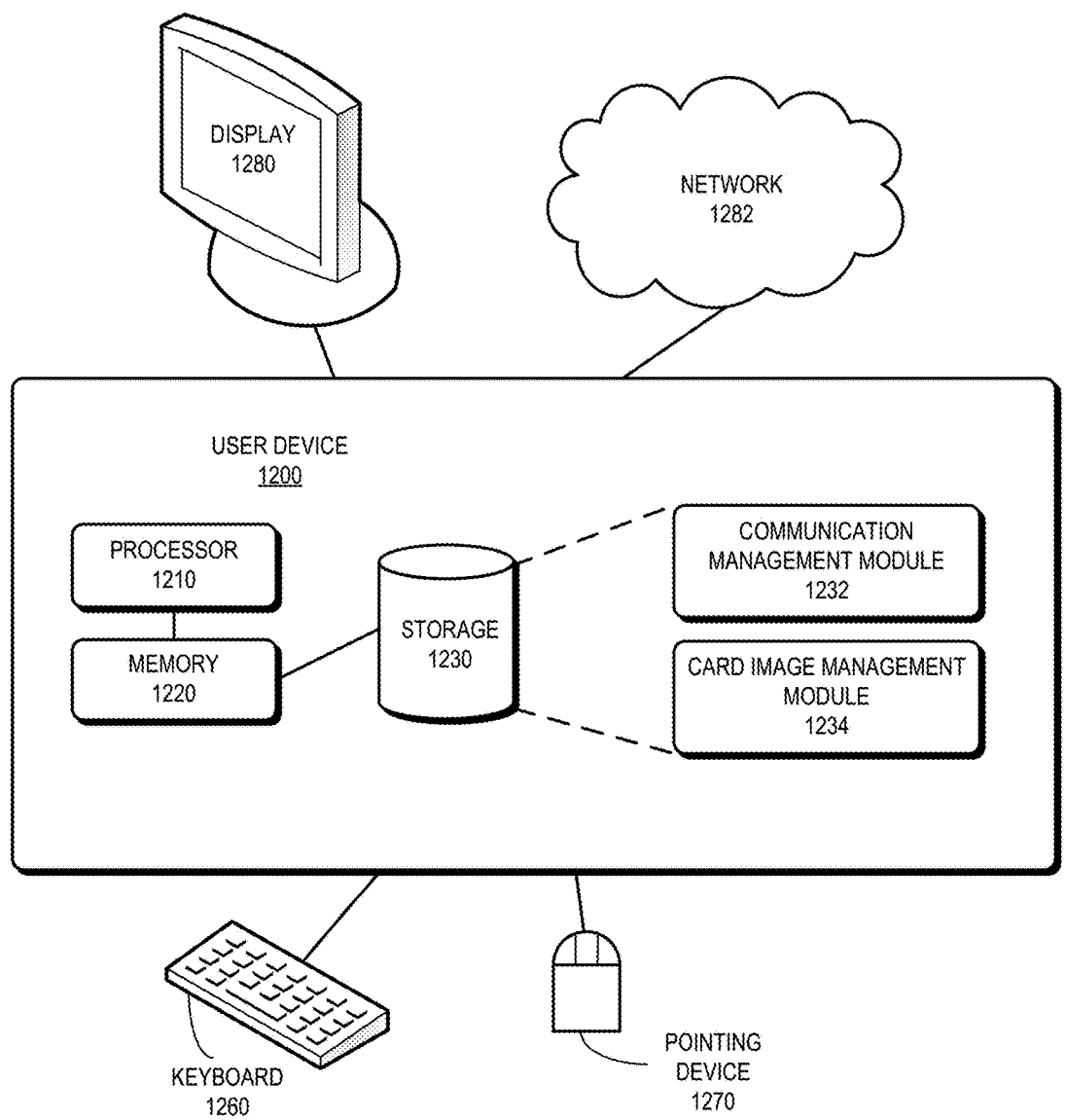
FIG. 12 illustrates an exemplary user device that facilitates secure identity verification based on features of a card, in accordance with an embodiment of the present application.

FIG. 12 illustrates an exemplary user device 1200 that facilitates secure identity verification based on features of a card, in accordance with an embodiment of the present invention. In this example, user device 1200 includes a processor 1210, a memory 1220, and a storage device 1230. Storage 1230 typically stores instructions that can be loaded into memory 1220 and executed by processor 1210 to perform the methods described above. In one embodiment, the instructions in storage 1230 can implement a communication management module 1232 and a card image management module 1234, each of which can communicate with each other through various means.

In some embodiments, modules 1232 and 1234 can be partially or entirely implemented in hardware and can be part of processor 1210. Further, in some embodiments, the system may not include a separate processor and memory. Instead, in addition to performing their specific tasks, modules 1232 and 1234, either separately or in concert, may be part of special-purpose computation engines.

Storage 1230 stores programs to be executed by processor 1210. Specifically, storage 1230 stores a program that implements a system (application) for facilitating secure identity verification based on features of a card. During operation, the application program can be loaded from storage 1230 into memory 1220 and executed by processor 1210. As a result, user device 1200 can perform the functions described above. User device 1200 can be further coupled to an optional display 1280, a keyboard 1260, and a pointing device 1270, and can be coupled via one or more network interfaces to a network 1282. Note that user device 1200 can be a personal computer, a tablet, a smartphone, or any type of mobile device. Furthermore, the functions of display 1280, keyboard 1260, and pointing device 770 can be provided by a touch screen.

During operation, card image management module 1234 obtains an image of a verifiable card. Communication management module 1232 sends a request to a server for identity verification, where the request includes the verifiable card image and corresponds to an account. Communication management module 1232 receives a response from the server, where the response indicates successful or unsuccessful identity verification.

Card image management module 1234 can obtain an image of a registered card, where the registered card is used to confirm a request for identity verification and corresponds to the account. Communication management module 1232 sends the registered card image to the server.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for verifying identity, the method comprising:
    registering, by an authorized user, a physical card for subsequent verification by a server by submitting a digital image of the physical card;
    receiving, by the server, a request for identity verification of a user for an online transaction, wherein the request corresponds to an account and includes a digital image of a verifiable physical card;
    extracting, based on an image-processing technique, a first card feature from the verifiable card image, wherein an extracted card feature includes a physical feature associated with a physical card or private information of the user;
    extracting, based on the image-processing technique, a second card feature from a digital image of a registered physical card which corresponds to the account, wherein the second card feature is encrypted based on an encryption algorithm;
    decrypting the encrypted second card feature based on a decryption algorithm which corresponds to the encryption algorithm; and
    in response to determining that the first card feature matches the decrypted second card feature, determining successful identity verification,
    which causes the user to proceed with the online transaction based on the verifiable physical card.

2. The method of claim 1, further comprising:
    receiving the digital image of the registered card; and
    storing the extracted second card feature.

3. The method of claim 1, wherein a card feature extracted from a corresponding card image of the verifiable card or the registered card is one or more of:
    a number feature;
    a pattern feature;
    a material feature; and
    a graphic feature, wherein the graphic feature is one or more of:
        a character feature;
        a logo feature; and
        a signature feature; and
    wherein the method further comprises:
        determining that each of one or more verifiable card features matches a corresponding one or more registered card features.

4. The method of claim 3, wherein the extracted card feature is a number feature which includes number information associated with the corresponding card image,
    wherein extracting the first card feature and the second card feature from the corresponding card image based on the image-processing technique further comprises:
        converting the card image into a grayscale image;
        determining a rectangular image area from the grayscale image that includes the number information; and
        identifying the number information in the rectangular image area; and
    in response to determining that the number information from the verifiable card feature matches the number information from the registered card feature, determining that the number feature of the verifiable card matches the number feature of the registered card.

5. The method of claim 4, wherein determining the rectangular image area comprises one or more steps of:
    identifying a template which corresponds to the card image, and determining the rectangular image area based on area and position information from the template;
    and
    segmenting the card image horizontally based on an edge detection algorithm, and determining the rectangular image area based on the segmented card image.

6. The method of claim 4, wherein identifying the number information in the rectangular image area comprises:
    segmenting the rectangular image area vertically based on an edge detection algorithm;
    determining a plurality of images of numbers based on the segmented rectangular image area, wherein each of the number images is an identifiable number image that includes an identifiable number;
    identifying one or more feature values for each identifiable number image;
    for each of one or more sample number images stored by the server, calculating a logical distance between the feature value for a respective identifiable number image and a corresponding feature value for the sample number image based on a classification algorithm; and
    in response to selecting one of the sample number images based on a shortest calculated logical distance, wherein the selected sample number image includes a number, determining that the identifiable number included in the identifiable number image is the number included in the selected sample number image.

7. The method of claim 3, wherein the extracted card feature is a pattern feature,
    wherein extracting the first card feature and the second card feature from the corresponding card image based on the image-processing technique further comprises:
        normalizing a size of the card image based on a predetermined size;
        extracting a predetermined number of image blocks from the normalized card image based on a predetermined position and a predetermined size;
        assigning a pixel value for each of the predetermined number of image blocks based on a sample set normalization for a respective image block;

determining a local feature for the respective image block based on a dictionary learning method; and identifying an image feature of the card image based on the local feature and a pooling technology;

calculating a logical distance between the pattern feature of the verifiable card and the pattern feature of the registered card, wherein the logical distance indicates a similarity of pattern images which correspond to the verifiable card pattern feature and the registered card pattern feature; and in response to determining that the calculated logical distance is greater than a predetermined threshold, determining that the pattern feature of the verifiable card matches the pattern feature of the registered card.

8. The method of claim 7, wherein extracting the pattern feature from the corresponding card image further comprises one or more steps of:

converting the card image into a grayscale image; and performing a whitening process on the respective image block, wherein the whitening process removes a correlation between neighboring pixel values.

9. The method of claim 3, wherein the extracted card feature is a pattern feature, wherein extracting the first card feature and the second card feature from the corresponding card image based on the image-processing technique further comprises:

extracting one or more feature points of the card image based on an image detection algorithm; and generating one or more corresponding feature vectors of the card image based on the image detection algorithm;

for each of the feature points of the pattern feature of the verifiable card:

calculating a logical distance between the corresponding vector of the verifiable card and a vector of the registered card that corresponds to the respective feature point of the pattern feature of the registered card; and in response to determining that a feature point of the verifiable card matches a feature point of the registered card based on the calculated logical distance, increasing a count of successfully matched feature points; and in response to determining that the count of successfully matched feature points is greater than a predetermined threshold, determining that the pattern feature of the verifiable card matches the pattern feature of the registered card.

10. The method of claim 3, wherein the extracted card feature is a material feature which includes data related to the card material from the corresponding card image, wherein extracting the first card feature and the second card feature from the corresponding card image based on the image-processing technique further comprises:

identifying an image area from the card image based on a predetermined position and a predetermined size, wherein the image area includes a plurality of pixel points; and extracting component values of hue, saturation, and luminance from each of the pixel points included in the image area;

generating a discrete sample curved surface based on the component values extracted from the pixel points corresponding to the registered card, wherein one component value is predetermined to be a vertical coordinate and the remaining component values are predetermined to be horizontal coordinates;

smoothing the discrete sample curved surface to obtain a continuous curved surface;

for each of the pixel points included in the image area corresponding to a verifiable card:

calculating a minimum distance between the component value of a respective pixel point and the continuous curved surface; and in response to determining that the calculated minimum distance is greater than a predetermined threshold:

determining that the respective pixel point matches the material feature of the registered card; and increasing a count of successfully matched pixel points; and in response to determining that the count of successfully matched pixel points is greater than a predetermined threshold, determining that the material feature of the verifiable card matches the material feature of the registered card.

11. The method of claim 10, wherein the component value of saturation is the predetermined vertical coordinate.

12. The method of claim 3, wherein the extracted card feature is a graphic feature, wherein extracting the first card feature and the second card feature from the corresponding card image based on the image-processing technique further comprises:

identifying a template which corresponds to the card image; and determining an image in the image area corresponding to the graphic feature in the card image based on area and position information from the template;

adjusting a size of the determined image corresponding to the graphic feature of the verifiable card, wherein the adjusted size is equal to a size of the corresponding image of the registered card;

for each of one or more pixel points in the adjusted size image of the verifiable card, in response to determining that a pixel value for a respective pixel point is equal to a pixel value for a corresponding pixel point in the corresponding image of the registered card, increasing a count of successfully matched pixel points; and in response to determining that the count of successfully matched pixel points is greater than a predetermined threshold, determining that the graphic feature of the verifiable card matches the graphic feature of the registered card.

13. A computer-implemented method for verifying identity, the method comprising:

registering, by an authorized user, a physical card for subsequent verification by a server by submitting a digital image of the physical card;

obtaining, by a client computing device, a digital image of a verifiable physical card, wherein the verifiable card image is used for identity verification of a user for an online transaction;

sending a request to a server for identity verification, wherein the request includes the digital image of the verifiable physical card and corresponds to an account; and in response to the request, receiving a response from the server, wherein the response indicates successful identity verification, which causes the user to proceed with the online transaction based on the verifiable physical card, or unsuccessful identity verification, which blocks the user from proceeding with the online transaction based on the verifiable physical card.

14. The method of claim 13, further comprising:
obtaining a digital image of the registered physical card, wherein the registered card image is used for identity verification and corresponds to the account; and
sending the digital image of the registered physical card to the server.

15. A computer system for facilitating identity verification, the computer system comprising:
a processor;
a memory coupled to the processor and storing instructions, which when executed by the processor cause the processor to perform a method, the method comprising:
registering, by an authorized user, a physical card for subsequent verification by a server by submitting a digital image of the physical card;
receiving, by the server, a request for identity verification of a user for an online transaction, wherein the request corresponds to an account and includes a digital image of a verifiable physical card;
extracting, based on an image-processing technique, a first card feature from the verifiable card image, wherein an extracted card feature includes a physical feature associated with a physical card or private information of the user;
extracting, based on the image-processing technique, a second card feature from a digital image of a registered card which corresponds to the account, wherein the second card feature is encrypted based on an encryption algorithm;
decrypting the encrypted second card feature based on a decryption algorithm which corresponds to the encryption algorithm; and
in response to determining that the first card feature matches the decrypted second card feature, determining successful identity verification,
which causes the user to proceed with the online transaction based on the verifiable physical card.

16. The computer system of claim 15, wherein the method further comprises:
receiving the digital image of the registered card; and
storing the extracted second card feature.

17. The computer system of claim 15, wherein a card feature extracted from a corresponding card image of the verifiable card or the registered card is one or more of:
a number feature;
a pattern feature;
a material feature; and
a graphic feature, wherein the graphic feature is one or more of:
a character feature;
a logo feature; and
a signature feature; and
wherein the method further comprises:
determining that each of one or more verifiable card features matches a corresponding one or more registered card features.

18. The computer system of claim 17, wherein the extracted card feature is a number feature which includes number information associated with the corresponding card image,
wherein extracting the first card feature and the second card feature from the corresponding card image based on the image-processing technique further comprises:
converting the card image into a grayscale image;
determining a rectangular image area from the grayscale image that includes the number information; and
identifying the number information in the rectangular image area; and
in response to determining that the number information from the verifiable card feature matches the number information from the registered card feature, determining that the number feature of the verifiable card matches the number feature of the registered card.

19. The computer system of claim 18, wherein determining the rectangular image area comprises one or more of:
identifying a template which corresponds to the card image, and determining the rectangular image area based on area and position information from the template;
and
segmenting the card image horizontally based on an edge detection algorithm, and determining the rectangular image area based on the segmented card image.

20. The computer system of claim 18, wherein identifying the number information in the rectangular image area comprises:
segmenting the rectangular image area vertically based on an edge detection algorithm;
determining a plurality of images of numbers based on the segmented rectangular image area, wherein each of the number images is an identifiable number image that includes an identifiable number;
identifying one or more feature values for each identifiable number image;
for each of one or more sample number images stored by the server, calculating a logical distance between the feature value for a respective identifiable number image and a corresponding feature value for the sample number image based on a classification algorithm; and
in response to selecting one of the sample number images based on a shortest calculated logical distance, wherein the selected sample number image includes a number, determining that the identifiable number included in the identifiable number image is the number included in the selected sample number image.

21. The computer system of claim 17, wherein the extracted card feature is a pattern feature,
wherein extracting the first card feature and the second card feature from the corresponding card image based on the image-processing technique further comprises:
normalizing a size of the card image based on a predetermined size;
extracting a predetermined number of image blocks from the normalized card image based on a predetermined position and a predetermined size;
assigning a pixel value for each of the predetermined number of image blocks based on a sample set normalization for a respective image block;
determining a local feature for the respective image block based on a dictionary learning method; and
identifying an image feature of the card image based on the local feature and a pooling technology;
calculating a logical distance between the pattern feature of the verifiable card and the pattern feature of the registered card, wherein the logical distance indicates a similarity of pattern images which correspond to the verifiable card pattern feature and the registered card pattern feature; and
in response to determining that the calculated logical distance is greater than a predetermined threshold, determining that the pattern feature of the verifiable card matches the pattern feature of the registered card.

22. The computer system of claim 17, wherein the extracted card feature is a pattern feature,
   wherein extracting the first card feature and the second card feature from the corresponding card image based on the image-processing technique further comprises:
      extracting one or more feature points of the card image based on an image detection algorithm; and
      generating one or more corresponding feature vectors of the card image based on the image detection algorithm;
   for each of the feature points of the pattern feature of the verifiable card:
      calculating a logical distance between the corresponding vector of the verifiable card and a vector of the registered card that corresponds to the respective feature point of the pattern feature of the registered card; and
      in response to determining that a feature point of the verifiable card matches a feature point of the registered card based on the calculated logical distance, increasing a count of successfully matched feature points; and
   in response to determining that the count of successfully matched feature points is greater than a predetermined threshold, determining that the pattern feature of the verifiable card matches the pattern feature of the registered card.

23. The computer system of claim 17, wherein the extracted card feature is a material feature which includes data related to the card material from the corresponding card image,
   wherein extracting the first card feature and the second card feature from the corresponding card image based on the image-processing technique further comprises:
      identifying an image area from the card image based on a predetermined position and a predetermined size, wherein the image area includes a plurality of pixel points; and
      extracting component values of hue, saturation, and luminance from each of the pixel points included in the image area;
   generating a discrete sample curved surface based on the component values extracted from the pixel points corresponding to the registered card, wherein one component value is predetermined to be a vertical coordinate and the remaining component values are predetermined to be horizontal coordinates;
   smoothing the discrete sample curved surface to obtain a continuous curved surface;
   for each of the pixel points included in the image area corresponding to a verifiable card:
      calculating a minimum distance between the component value of a respective pixel point and the continuous curved surface; and
      in response to determining that the calculated minimum distance is greater than a predetermined threshold:
         determining that the respective pixel point matches the material feature of the registered card; and
         increasing a count of successfully matched pixel points; and
   in response to determining that the count of successfully matched pixel points is greater than a predetermined threshold, determining that the material feature of the verifiable card matches the material feature of the registered card.

24. The computer system of claim 17, wherein the extracted card feature is a graphic feature,
   wherein extracting the first card feature and the second card feature from the corresponding card image based on the image-processing technique further comprises:
      identifying a template which corresponds to the card image; and
      determining an image in the image area corresponding to the graphic feature in the card image based on area and position information from the template;
   adjusting a size of the determined image corresponding to the graphic feature of the verifiable card, wherein the adjusted size is equal to a size of the corresponding image of the registered card;
   for each of one or more pixel points in the adjusted size image of the verifiable card, in response to determining that a pixel value for a respective pixel point is equal to a pixel value for a corresponding pixel point in the corresponding image of the registered card, increasing a count of successfully matched pixel points; and
   in response to determining that the count of successfully matched pixel points is greater than a predetermined threshold, determining that the graphic feature of the verifiable card matches the graphic feature of the registered card.

25. A computer system for facilitating identity verification, the computer system comprising:
   a processor;
   a memory coupled to the processor and storing instructions, which when executed by the processor cause the processor to perform a method, the method comprising:
      registering, by an authorized user, a physical card for subsequent verification by a server by submitting a digital image of the physical card;
      obtaining, by a client computing device, a digital image of a verifiable physical card, wherein the verifiable card image is used for identity verification of a user for an online transaction;
      sending a request to a server for identity verification, wherein the request includes the digital image of the verifiable physical card and corresponds to an account; and
      in response to the request, receiving a response from the server, wherein the response indicates successful identify verification, which causes the user to proceed with the online transaction based on the verifiable physical card, or unsuccessful identity verification, which blocks the user from proceeding with the online transaction based on the verifiable physical card.

26. The computer system of claim 25, wherein the method further comprises:
   obtaining a digital image of the registered physical card, wherein the registered card image is used for identity verification and corresponds to the account; and
   sending the digital image of the registered physical card to the server.

* * * * *